(12) United States Patent
Kotagiri et al.

(10) Patent No.: US 8,689,047 B2
(45) Date of Patent: Apr. 1, 2014

(54) VIRTUAL DISK REPLICATION USING LOG FILES

(75) Inventors: Sriravi Kotagiri, Hyderabad (IN); Rahul Shrikant Newaskar, Hyderabad (IN); Palash Kar, Hyderabad (IN); Shreesh Rajendra Dubey, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 13/188,480

(22) Filed: Jul. 22, 2011

(65) Prior Publication Data

US 2013/0024722 A1      Jan. 24, 2013

(51) Int. Cl.
*G06F 11/00* (2006.01)

(52) U.S. Cl.
USPC ............................................ 714/15; 714/6.1

(58) Field of Classification Search
USPC ............. 714/15, 16, 18, 2, 6.1, 6.11, 6.12, 17
See application file for complete search history.

(56) References Cited

U.S. PATENT DOCUMENTS

| | | | |
|---|---|---|---|
| 7,707,372 B1 * | 4/2010 | Kumar et al. ................. | 711/162 |
| 7,788,521 B1 | 8/2010 | Sim-Tang | |
| 8,117,410 B2 * | 2/2012 | Lu et al. ........................ | 711/162 |
| 8,234,518 B2 * | 7/2012 | Hansen ......................... | 714/4.11 |
| 2008/0162590 A1 | 7/2008 | Kundu et al. | |
| 2008/0183922 A1 | 7/2008 | Sampathkumar | |

OTHER PUBLICATIONS

Howard, John S., "Online Backups Using the VxVM Snapshot Facility", Retrieved at <<http://www.sun.com/blueprints/0900/vxvmfac.pdf>>, Sep. 2000, pp. 7.
"Citrix XenServer and NetApp Storage Best Practices", Retrieved at http://www.citrix.com/site/resources/dynamic/partnerDocs/XSandNetAppstoragebestpractices_7.15.10.pdf>>, May 2010, pp. 1-104.
"Second-generation CDP", Retrieved at http://searchstorage.techtarget.com/magPrintFriendly/0,293813, sid5_gci1334530,00.html>>, Oct. 12, 2008, pp. 6.
"Oracle Database High Availability Features and Products", Retrieved at <<http://download.oracle.com/docs/cd/B28359_01/server.111/b28281/hafeatures.htm>>, Retrieved Date: Mar. 24, 2011, pp. 51.
"Application Consistent Snapshot Backups", Retrieved at http://www.ca.com/Files/TechnicalDocuments/arcserve-d2d-app-consistent-snapshot_235095.pdf>>, Retrieved Date: Mar. 24, 2011, pp. 2.

* cited by examiner

*Primary Examiner* — Dieu-Minh Le
(74) *Attorney, Agent, or Firm* — Glen Johnson; Micky Minhas

(57) ABSTRACT

Techniques involving replication of virtual machines at a target site are described. One representative technique includes an apparatus including a virtual machine configured to provide storage access requests targeting a virtual disk. A storage request processing module is coupled to the virtual machine to receive the storage access requests and update the virtual disk as directed by the storage access requests. A replication management module is coupled to the virtual machine to receive the storage access requests in parallel with the storage request processing module, and to store information associated with the storage access requests in a log file(s). The log file may be transferred to a destination as a recovery replica of at least a portion of the virtual disk.

20 Claims, 14 Drawing Sheets

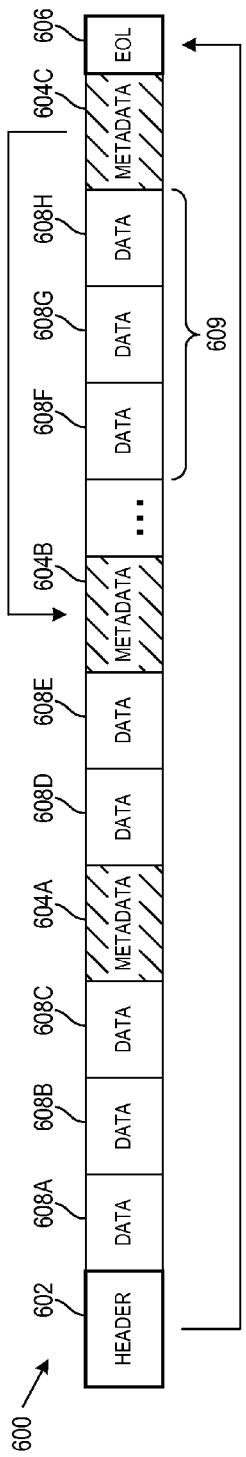

| FIELDS | SIZE (BYTES) |
|---|---|
| PREVIOUS METADATA LOCATION | 8 |
| VALID METADATA ENTRIES | 4 |
| CHECKSUM | 4 |
| RESERVED | 16 |

| FIELDS | SIZE (BYTES) |
|---|---|
| BYTE OFFSET | 8 |
| CHECKSUM | 4 |
| DATA LENGTH | 4 |
| TIMESTAMP | 4 |
| META OPERATION | 1 |
| RESERVED | 11 | ns
VIRTUAL DISK REPLICATION USING LOG FILES

BACKGROUND

With the heavy reliance on computing needs by businesses and individuals, the need for uninterrupted computing service has become increasingly vital. Many organizations develop business continuity plans to ensure that critical business functions will enjoy continuous operation and remain available in the face of machine malfunctions, power outages, natural disasters, and other disruptions that can sever normal business continuity.

Local disruptions may be caused, for example, by hardware or other failures in local servers, software or firmware issues that result in system stoppage and/or re-boot, etc. Local solutions may include server clustering and virtualization techniques to facilitate failover. Local failover techniques using virtualization provide the ability to continue operating on a different machine or virtual machine if the original machine or virtual machine fails. Software can recognize that an operating system and/or application is no longer working, and another instance of the operating system and application(s) can be initiated in another machine or virtual machine to pick up where the previous one left off For example, a hypervisor may be configured to determine that an operating system is no longer running, or application management software may determine that an application is no longer working which may in turn notify a hypervisor or operating system that an application is no longer running. High availability solutions may configure failover to occur, for example, from one machine to another at a common site, or as described below from one site to another.

Disaster recovery relates to maintaining business continuity on a larger scale. Certain failure scenarios impact more than an operating system, virtual machine, or physical machine. Malfunctions at a higher level can cause power failures or other problems that affect an entire site, such as a business's information technology (IT) or other computing center. Natural and other disasters can impact an enterprise that can cause some, and often all, of a site's computing systems to go down. To provide disaster recovery, enterprises today may back up a running system onto tape or other physical media, and mail or otherwise deliver it to another site. The backup copies can also be electronically provided to a remote location. By providing a duplicate copy of the data, applications can be resumed at the remote location when disaster strikes the source server site.

When using virtual machines, disaster recovery may involve tracking changes to virtual disks in order to replicate these changes at the remote site. Current approaches for tracking changes result in additional read and write overhead for data that has changed. These change tracking mechanisms consume additional storage input/output operations per second (IOPS) from those otherwise available for server workloads. For example, differencing disks have primary purposes in areas such as test and development, and may not have been developed with tracking changes and replication in mind. While differencing disks enable changes to be written to them, processing differencing disks for the purpose of replication is I/O-intensive. Where response times of the workloads are impacted, the overall value of a replication solution is adversely affected.

Limited network bandwidth can affect a replication solution and negatively impact the recovery point objective (RPO). If the network bandwidth is insufficient, it can take a long time to transfer large virtual disk files. Compounding the problem is that a virtual disk block identified as changed may be larger than the actual quantity of data that changed, resulting in even higher quantities of data needing transfer. For example, a two megabyte (2 Mb) block may be created to capture changes. Even if only a small change is made (e.g., 4 Kb), the 2 Mb block is used. These and other inefficiencies and shortcomings of the prior art create still more concern for the RPO.

SUMMARY

Techniques involving replication of virtual machines at a target site are described. One representative technique includes an apparatus including a virtual machine configured to provide storage access requests targeting a virtual disk. A storage request processing module is coupled to the virtual machine to receive the storage access requests and update the virtual disk as directed by the storage access requests. A replication management module is coupled to the virtual machine to receive the storage access requests in parallel with the storage request processing module, and to store information associated with the storage access requests in a log file(s). A transmitter may be configured to transfer the log file to a destination as a recovery replica of at least a portion of the virtual disk.

In another representative implementation, a computer-implemented method is provided for facilitating replication of virtual machines. The computer-implemented method includes receiving a log file of changes duplicating changes made to primary virtual storage of a primary virtual machine, where the log file includes a log file header, blocks of data that changed in the primary virtual storage, and metadata blocks to specify locations of the data in the log file. A first metadata block in the log file is located using information from the log file header, and the address of the first metadata block is stored. One or more additional metadata blocks in the log file are located, each metadata block being located using information from its respectively preceding one of the metadata blocks in the log file. The addresses of each of the one or more additional metadata blocks that are located in the log file are stored. The data identified by each of the stored metadata blocks are located, and the located data is stored in replicated virtual storage operable by a recovery virtual machine to replicate the primary virtual machine.

In still another representative implementation, computer-readable media is provided with instructions stored thereon, the instructions being executable by a computing system for performing functions. The functions include queuing write requests issued by a primary virtual machine in a first queue, and queuing the write requests issued by the virtual machine in a second queue in parallel with queuing the write requests in the first queue. Data in a virtual disk utilized by the virtual machine is updated using the write requests from the first queue. A log file is updated using the write requests in the second queue. The log file is transferred for use in generating replicated virtual storage accessed by a recovery virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6A-6E illustrate representative log file and metadata formats;

DETAILED DESCRIPTION

Figure 1A:
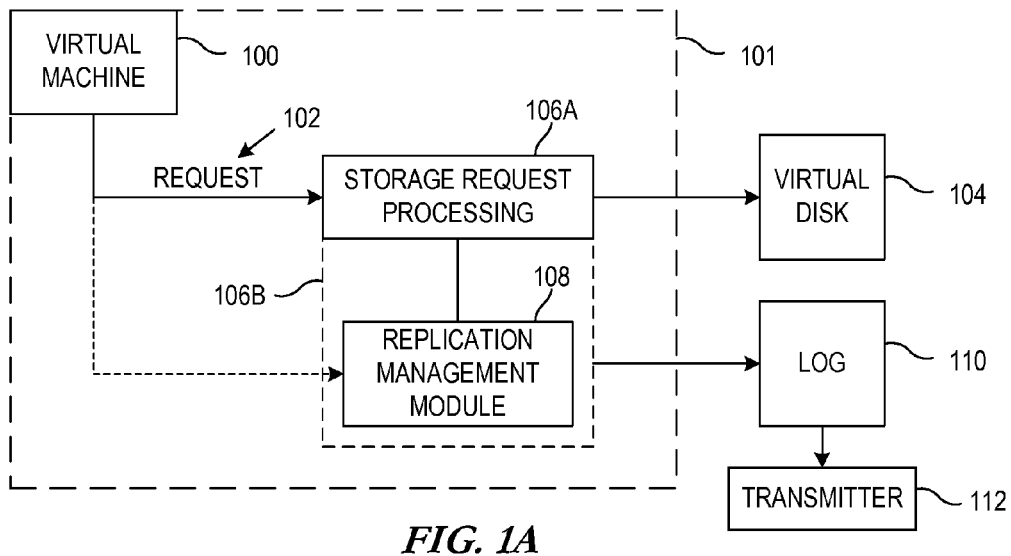
FIGS. 1A and 1B are block diagrams generally illustrating representative embodiments of techniques for tracking changes to a virtual disk.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to data replication and recovery. While the principles described herein are applicable to any replication from one device or facility to another device or facility, numerous embodiments in this disclosure are described in the context off-site disaster recovery where replicated data and processing resources are provided remotely from the primary computing center. It should be recognized, however, that the principles described herein are applicable regardless of the distance or manner in which replicated data is transferred to a recovery target(s). Certain embodiments are also described in the context of virtual machines, although the principles are equally applicable to physical machines and their available storage.

Various embodiments below are described in terms of virtual machines. Virtualization generally refers to an abstraction from physical resources, which can be utilized in client and server scenarios. Hardware emulation involves the use of software that represents hardware the operating system would typically interact with. Hardware emulation software can support guest operating systems, and virtualization software such as a hypervisor can establish a virtual machine (VM) on which a guest operating system operates. Much of the description herein is described in the context of virtual machines, but the principles are equally applicable to physical machines that do not employ virtualization.

To enable a recovery or other target server(s) to begin running a system or virtual machine when its replicated source server fails, the information associated with that system or virtual machine is provided to the recovery server. In the context of virtual machines, a base replication can be provided, and updates or changes to that base replication can be provided as the virtual machine is running on its primary server.

As noted above, current approaches for tracking changes result in additional read and write overhead for data that has changed. These change tracking mechanisms consume storage IOPS that would otherwise be used for primary server workloads. For example, differencing disks may be used to capture changes relative to a base virtual disk. Each differencing disk is configured as a "child" virtual disk of changes relative to its respective "parent" disk in the chain of disks and differencing disks. The differencing disk stores the changes that would otherwise be made to the base or other parent disk if the differencing disk was not used. However, the use of differencing in replication situations results in the utilization of IOPS that could otherwise be used for normal workload processing. Differencing disks have primary purposes in areas such as test and development, and may not have been developed with tracking changes and replication in mind as their use is quite I/O-intensive.

For example, when using differencing disks, extra overhead in the form of consumed IOPS is involved in taking snapshots, transferring the snapshots, replacing the snapshot with a new differencing disk, etc. Further, differencing disks are typically dynamically expandable such that they expand to accommodate newly stored changes, which involves processing to manage the expansion. Changes recorded to a differencing disk are marked on a sector bitmap that shows which sectors are associated with the child disk and which with the parent disk, which again consumes some of the available IOPs. Change tracking mechanisms may keep metadata to describe the changes. The organization of metadata also consumes some storage IOPS, and can thus impact a replication solution. As these examples illustrate, the overhead associated with creating, managing and maintaining differencing disks may result in many I/O operations for a lesser quantity of virtual machine write operations.

Further latencies may be experienced with differencing disks and other prior solutions. In one example, a virtual disk block that is identified as changed may be significantly larger than the quantity of data that actually changed. For example, a 2 Mb block may be created to capture changes, which is dealt with in its entirety even though only a small change may have been made (e.g., 4 Kb). A significant amount of unchanged data may end up getting stored and/or transferred, and such unchanged data is superfluous data that takes time to unnecessarily process, store, transmit, etc.

In the case of virtual machines, a virtual disk storage location can dynamically change while a virtual machine is running. A change tracking mechanism should see that information regarding those changes is not lost when a virtual disk migrates to new storage location. If storage migration is not properly handled by a change tracking mechanism, virtual disks in source and target servers will be out of synchronization following any such storage migration. Any mechanism to get a target virtual storage synchronized with the source virtual storage could take a long time, and impact the RPO.

The present disclosure addresses these and other needs relating to replication and recovery, such as the replication of a primary virtual machine(s) and its recovery elsewhere if the primary virtual machine becomes inoperative. The disclosure describes mechanisms and techniques in which differencing disks or other similar mechanisms are not needed to provide virtual storage replication and virtual machine recovery. In one example described herein, log files are created that capture changes being made to a storage device, including a virtual disk. In one virtual machine embodiment, the log file(s) can be created by preserving duplicates of change requests that are queued for inclusion into the virtual disk. In one embodiment the log file processing and updating is performed in parallel with the processing that updates the virtual disk, such that replicated data is created without additional latencies, and prepares the log file in such a way that it is easily transferred to a recovery site(s) while limiting the impact of IOPS to the running workload. Thus, while the mechanisms and techniques described herein may be used in addition to technologies such as differencing disks when used for other purposes, replication may be effected without the existence of any differencing disks in accordance with the disclosure.

In one embodiment, a virtual machine's write requests that are destined for a virtual disk are copied to a log data structure, such as a log queue. The log entries are taken from the queue and processed into a log file. In one embodiment, writes to the log file are accumulated in memory, versus storage such as a virtual disk, disk or other physical storage. The write request information may be accumulated in memory before writing to the physical disk in order to, for example, reduce the impact on workload performance and response times inside the virtual machine. The writes to the log file may be coordinated with the writes to the virtual disk file (e.g. virtual hard disk or "VHD" file) to, among other things, facilitate application-consistent snapshots of virtual machines. Some embodiments involve replicating the log file writes within a virtual disk parser module to facilitate seamless change tracking across storage migrations. The log file may be defined in a manner to reduce the storage requirements and total network transfer time of the virtual disk changes to the target location. One embodiment provides the ability to switch to a new log file for capturing virtual disk changes without holding writes to the virtual hard disk. Further, an embodiment of the log file format is agnostic to virtual hard disk file format and type, such that it can be used to capture changes to a virtual disk of any type and format. These representative solutions to problems associated with existing replication techniques are described in greater detail below.

FIG. 1A is a block diagram generally illustrating a representative embodiment of a technique for tracking changes to a virtual disk. Storage access requests 102 may be provided by any source, such as the virtual machine (VM) 100. The description applies to processors and other sources of storage access requests, but in the representative example of FIG. 1A, the source of the requests is a VM 100. The storage access requests 102 may be any type of storage access request, such as write requests, a request to expand or contract the disk, or any other storage operation that will result in changes to the disk. In one embodiment, the storage access requests 102 represent write requests to store data.

In the illustrated embodiment, the data is stored in a virtual disk 104, which in one embodiment represents a file(s) stored on physical storage media. The storage request processing module 106A is configured to direct and process incoming requests 102 to the virtual disk 104. For example, the requests 102 may represent write requests that are temporarily buffered at the storage request processing 106B until they can be used to update the virtual disk 104. It should be recognized that the virtual disk 104 may include a single virtual storage file (e.g. VHD file) or multiple files (e.g. VHD file and one or more AVHD or other differencing disk files). For example, in one embodiment, changes to the virtual disk 104 may be made to a single file representing the virtual disk 104. In such an embodiment, log files as described herein may be used in lieu of differencing disks or similar states of the virtual disk 104 for replication purposes.

The replication management module 108 is configured to receive the same storage access requests 102 that are being received at the storage request processing module 106A. In various embodiments, the storage access requests 102 may be received from the VM 100, an intermediate module (not shown), or from the storage request processing module 106A itself. In one embodiment, the replication management module 108 is implemented integrally with the storage request processing module 106B. In such a case, the replication management module 108 may receive a copy of the storage access request 102 upon receipt at the storage request processing module 106A, or the storage request processing module 106A may create and provide a copy of the storage access requests 102 to the replication management module 108. It should be noted that modules such as the storage request processing module 106A/B and the replication management module 108 may be provided within the VM 100 as depicted by box 101, or may be provided by a hypervisor, parent partition operating system or other operating system, etc. The log file may be transmitted, such as via transmitter 112, to a target system where a recovery system or virtual machine may be instantiated to replicate the virtual machine 100.

The replication management module 108 may buffer the storage access requests 102 in parallel with the buffering and/or processing of the storage access requests 102 by the storage request processing module 106A. The buffered storage access requests 102 are written to a log 110, such as a log file, for replication purposes without significantly impacting storage IOPS. Therefore, as write requests or other storage access requests 102 are being processed to update the virtual disk 104 in response to VM 100 processing, the replication management module tracks changes to the virtual disk 104 in a log 110.

In one embodiment, a replication module such as that depicted in FIG. 1A can include a VM 100 that is configured to provide storage access requests 102 that target a virtual disk(s) 104. The storage request processing module 106A may be coupled to the VM 100 to receive the storage access requests 102, and update the virtual disk 104 as directed by the storage access requests. The replication management module 108 may be coupled to the VM 100 to receive the storage access requests 102 in parallel with the storage request processing module 106A. The replication management module 108 can store the storage access requests in a log(s) 110, such as a log file, that can be stored in memory, internal storage, external storage, remote storage, etc. A transmitter 112, which may be a stand-alone transmitter or associated with another device (e.g. transceiver, network interface module, etc.), that can provide the log 110 to a destination such as a recovery server as a recovery replica of at least a portion of the virtual disk 104.

Figure 1B:
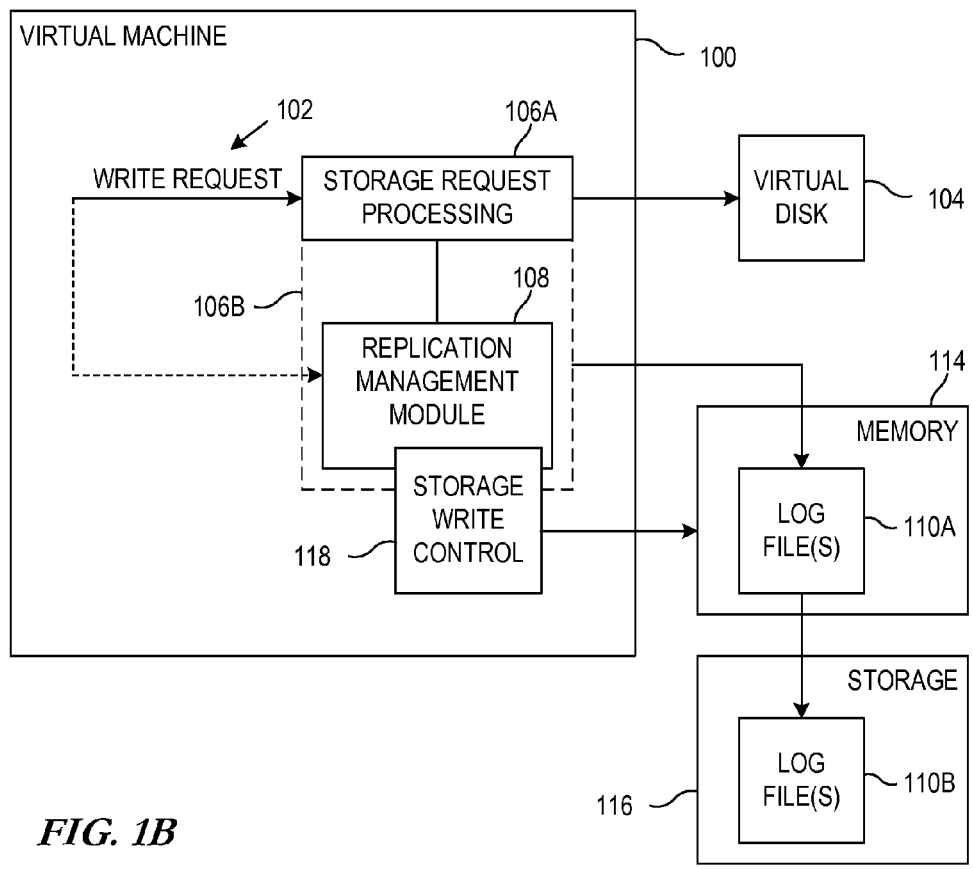

FIG. 1B is a block diagram illustrating another representative embodiment of a technique for tracking changes to a virtual disk. In this example, reference numbers corresponding to those in FIG. 1A are used to identify like modules. In this embodiment, the VM 100 issues write requests 102 that will ultimately change the virtual disk 104 with the data being written thereto. Both the storage request processing module 106A and the replication management module 108 receive the write requests 102. As the storage request processing module 106A processes the write requests 102 for inclusion on the virtual disk 104, the replication management module 108 queues the write requests 102 for ultimate writing to a log file(s) 110A.

In one embodiment, the log file 110A is captured in memory 114 to reduce I/O processing and improve IOPS relative to prior solutions involving writing to disk such as differencing disks. The log file 110A may be written to storage 116 at desired intervals such as, for example, fixed intervals, random intervals, intervals based on triggered events, etc. The storage write control module 118 may determine when a log file(s) 110A in memory 114 will be written to storage 116 as depicted by log file(s) 110B. In one embodiment, the storage write control 118 writes the log file 110A to the storage 116 as depicted by log file 110B, when the memory 114 that has been allocated for the log file(s) 110A reaches a threshold. As merely an example, a write of the log file 110A from memory 114 to log file 110B in storage 116 may occur when the allocated memory for the log file 110A reaches 90% capacity. By accumulating write requests 102 in memory 114 and infrequently writing to the physical storage 116, the impact on VM 100 workload performance and response times inside the VM 100 can be reduced.

Figure 2:
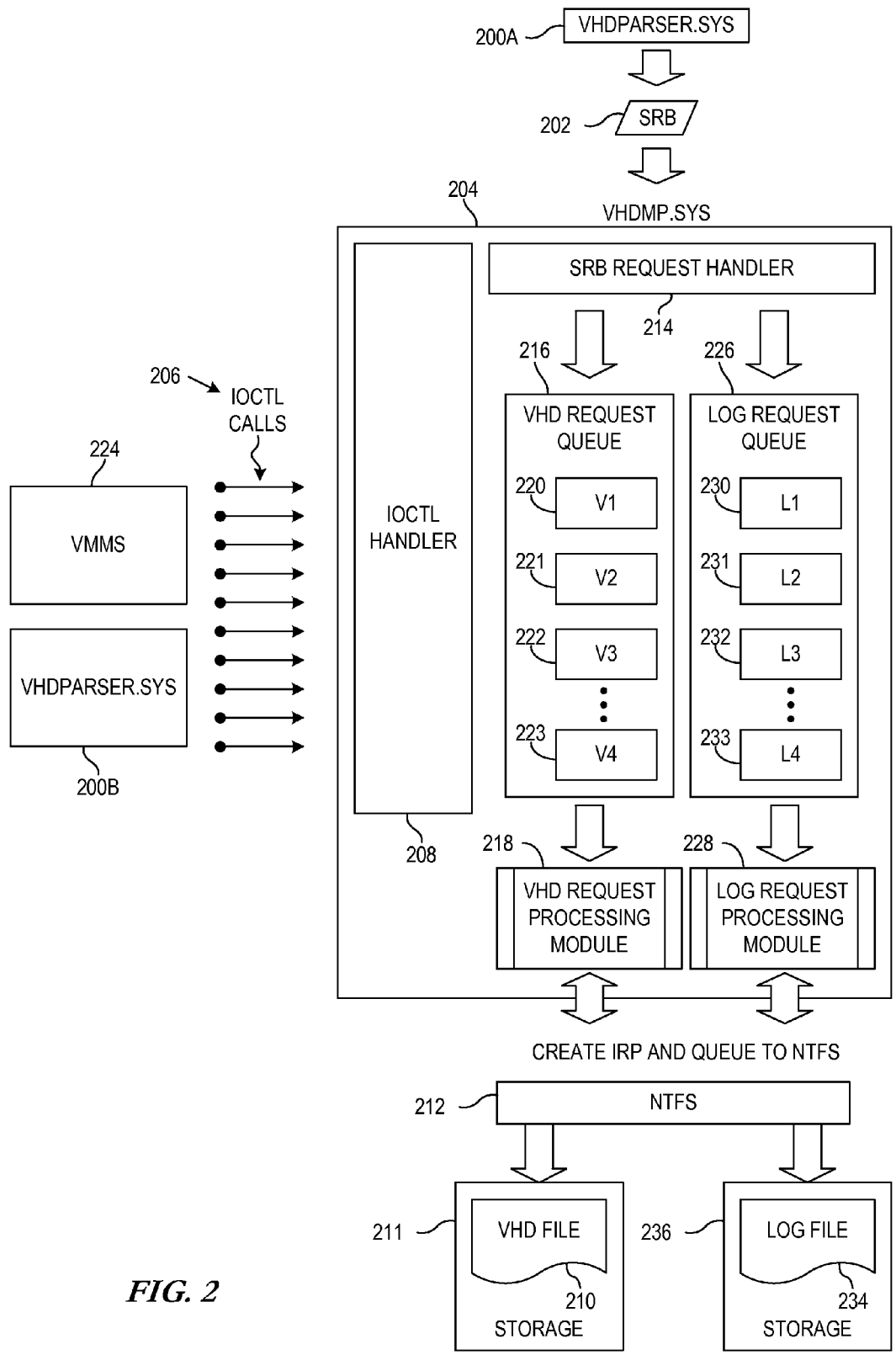
FIG. 2 is a block diagram of a representative architecture for creating replication log files in accordance with the disclosure.

FIG. 2 is a block diagram of a representative architecture for creating replication log files in accordance with the disclosure. The storage access requests may be input/output (I/O) write requests, and in the particular illustrated embodiment the write requests are small computer system interface (SCSI) request blocks (SRB) 202. The SRB 202 is a representative manner in which an I/O request can be submitted to a storage device. The SRB 202 may include information such as the command to send to the device, the buffer location and size, etc. In one embodiment, each change request to a virtual disk comes in the form of an SRB 202. While SRBs are used in the present example, the description is equally applicable to other I/O request types to access storage devices.

In the illustrated example, the SRB 202 is provided by an interface to upper layers, shown as the VHDParser.sys 200A in the present example. In this example, the VHDParser.sys 200 represents an internal interface to the upper layers, which performs internal translation and sends the SRB 202 to a replication management module, which in FIG. 2 is provided by a virtual disk parser 204. Storage requests may also be provided via the VHDParser.sys 200B which again is an interface to upper layers, where the storage requests may be provided via an input/output control (IOCTL) call 206 which is handled by the IOCTL handler 208. The IOCTL handler 208 provides an interface through which an application on the virtual machine can communicate directly with a device driver using control codes. Thus, storage access requests may be received via one or more different input types.

In the illustrated embodiment, the virtual disk parser 204 may be an adaptation of a virtual hard disk (VHD) mini-port, such as VHDMP.sys available in HYPER-V™ by MICROSOFT® Corporation. Assuming in this example that the virtual disk is represented by a VHD file 210, the storage stack for such VHD files 210 can include a mini-port driver such as VHDMP.sys, which represents the VHD parser 204. The VHD parser 204 enables I/O requests to the VHD file 210 in storage 211 to be sent to the host file system, such as, for example, a new technology file system (NTFS) 212.

For purposes of example, it is assumed in the description of FIG. 2 that the SRBs 202 include write requests to change a virtual disk such as the VHD file 210. The SRBs 202, which originate inside the VM, reach the virtual disk parser 204 at the SRB request handler 214. In one embodiment, the SRB request handler 214 creates an instance of a custom data structure for each SRB 202, and embeds the SRB 202 inside this instance which is added to the VHD request queue 216. This VHD request queue 216 maintains the write requests to the VHD file 210 that are pending for processing. The SRB request handler 214 adds these SRBs 202 to this queue 216, and as described below the VHD request processing module 218 removes the write requests from this VHD request queue 216 to process them. A few representative VHD request queue 216 entries are depicted as V1 220, V2 221, V3 222 and V4 223.

In one embodiment, the IOCTL handler 208 may also receive requests from management modules, such as virtual machine management service (VMMS) 224 (e.g. VMMS.exe) provided as part of HYPER-V™ by MICROSOFT® Corporation. The VMMS 224 generally represents a management service that serves as a point of interaction for incoming management requests. The VMMS 224 can provide requests to the IOCTL handler 208 for enabling and disabling change tracking for a virtual disk in accordance with the disclosure. For example, the VMMS 224 may issue a request via an IOCTL call 206 to the IOCTL handler 208, which causes the log request queue 226 and log request processing module 228 to be initialized. The IOCTL handler 208 also enables changing log files that are used for storing changes while the VM is running.

When change tracking is enabled, another instance of the custom data structure for the SRB 202 added to the VHD request queue 216 is created and added to the log request queue 226. In one embodiment, a data buffer of write requests (e.g. SRBs 202) may be shared by the custom data structure instances for the SRBs 202 in both the VHD request queue 216 and the log request queue 226. The log request queue 226 maintains the log write requests that are pending for processing. Representative log request queue 226 entries are depicted as L1 230, L2 231, L3 232 and L4 233.

The VHD request processing module 218 will remove queued write requests from queue entries 220-223 of the VHD request queue 216 to process them. Based on the virtual hard disk format and type, in one embodiment the VHD request processing module 218 will send one or more I/O request packets (IRPs) to the VHD file 210 via NTFS 212 to complete the write request. When all of the issued IRPs are completed for a particular queued write request (e.g. request in queue entry V4 223), the write request is considered complete, and a completion response for this write request can be returned.

The log request processing module 228 will remove queued write requests from log queue entries 230-233 of the log request queue 226 to process them. The log request queue 226 is copied to the log file 234 that, in the illustrated embodiment, is stored in storage 236. The storage 236 may be the same or different storage as the storage 211 in which the VHD files are stored. It should be noted that in one embodiment, while the log file(s) 234 may be stored in some storage 236, the log files are cached or otherwise buffered in memory until a time when they will be sent to storage 236. In one embodiment, a metadata entry is written in current metadata. If the current metadata is full, it is written to a new log file and a new metadata is allocated to store new entries.

In the example of FIG. 2, a virtual machine's write requests (e.g. SRB 202) that are destined for a virtual disk (e.g. VHD file 210) are copied to a log data structure, such as the log request queue 226. The log entries 230-233 are taken from the log request queue 226 and processed into a log file 234. In one embodiment, writes to the log file 234 are accumulated in memory prior to being stored in storage 236.

Figure 3:
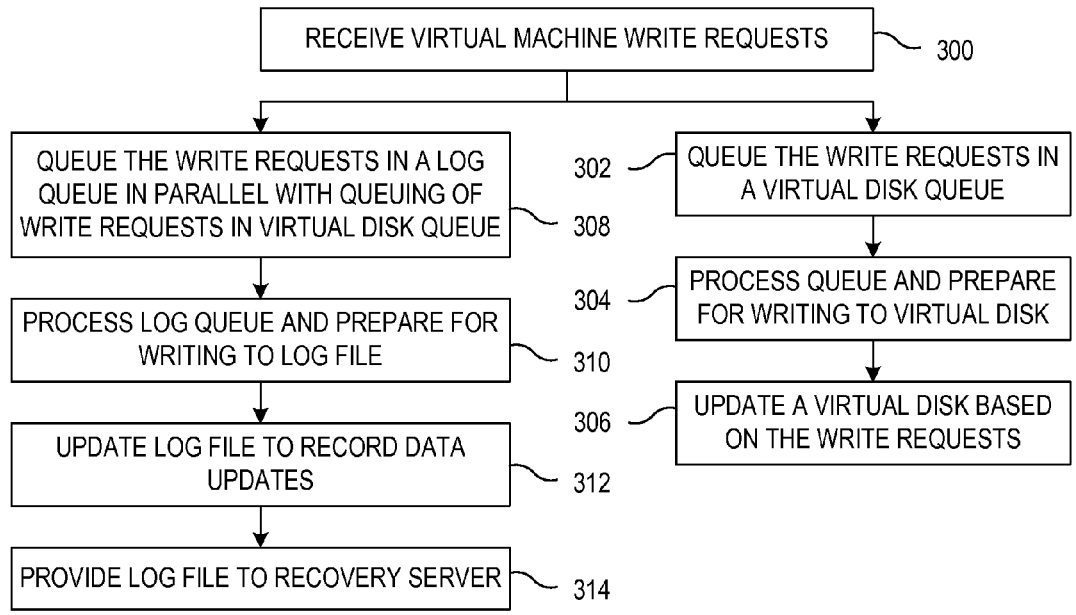
FIGS. 3 and 4 are flow diagrams of representative methods for creating replication log files in accordance with the disclosure.
Figure 4:
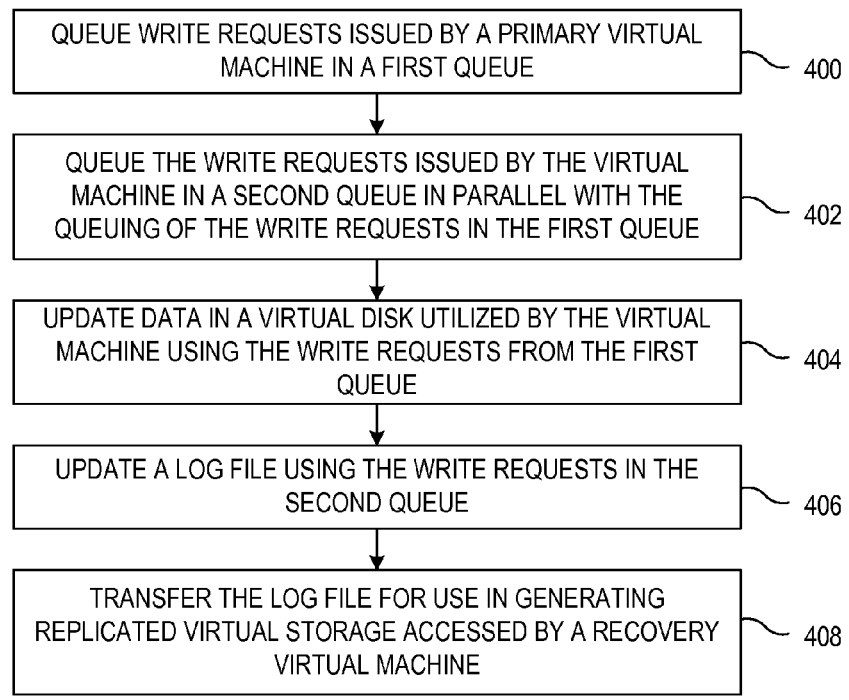

FIGS. 3 and 4 are flow diagrams of representative methods for creating replication log files in accordance with the disclosure. Referring to FIG. 3, block 300 depicts write requests received from a virtual machine. Block 302 shows that the write requests may be queued in a virtual disk queue. The queue may be processed and prepared for writing to the virtual disk at block 304, and as shown at block 306 the virtual disk may be updated based on the write requests. In accordance with the disclosure, block 308 shows that the write requests are also queued in a log queue in parallel with the queuing of the write requests in the virtual disk queue. For example, the write requests may be copied from the virtual disk queue to the log queue, or alternatively the log queue may receive the write requests from upstream modules such as a request handler. In one embodiment, the log queue is processed and prepared for writing to a log file, as shown at block 310. The log file is updated to record data updates at block 312, and the log file may be provided to a recovery server or other destination as shown at block 314.

FIG. 4 illustrates another representative method, which includes queuing write requests issued by a primary virtual machine in a first queue, as block 400 depicts. At block 402, the write requests issued by the virtual machine are queued in a second queue in parallel with the queuing of the write requests in the first queue. At block 404, the data in the virtual disk utilized by the virtual machine is updated using the write requests from the first queue. A log file is updated using the write requests in the second queue, as shown at block 406. At block 408, the log file is transferred for use in generating replicated virtual storage accessed by a recovery virtual machine.

The embodiments of FIGS. 3 and 4, in addition to other methods and techniques described herein, may be implemented at computer-implemented methods for carrying out the various functions. The functions may also be performed by instructions stored on computer-readable media, as later described in greater detail.

Figure 5:
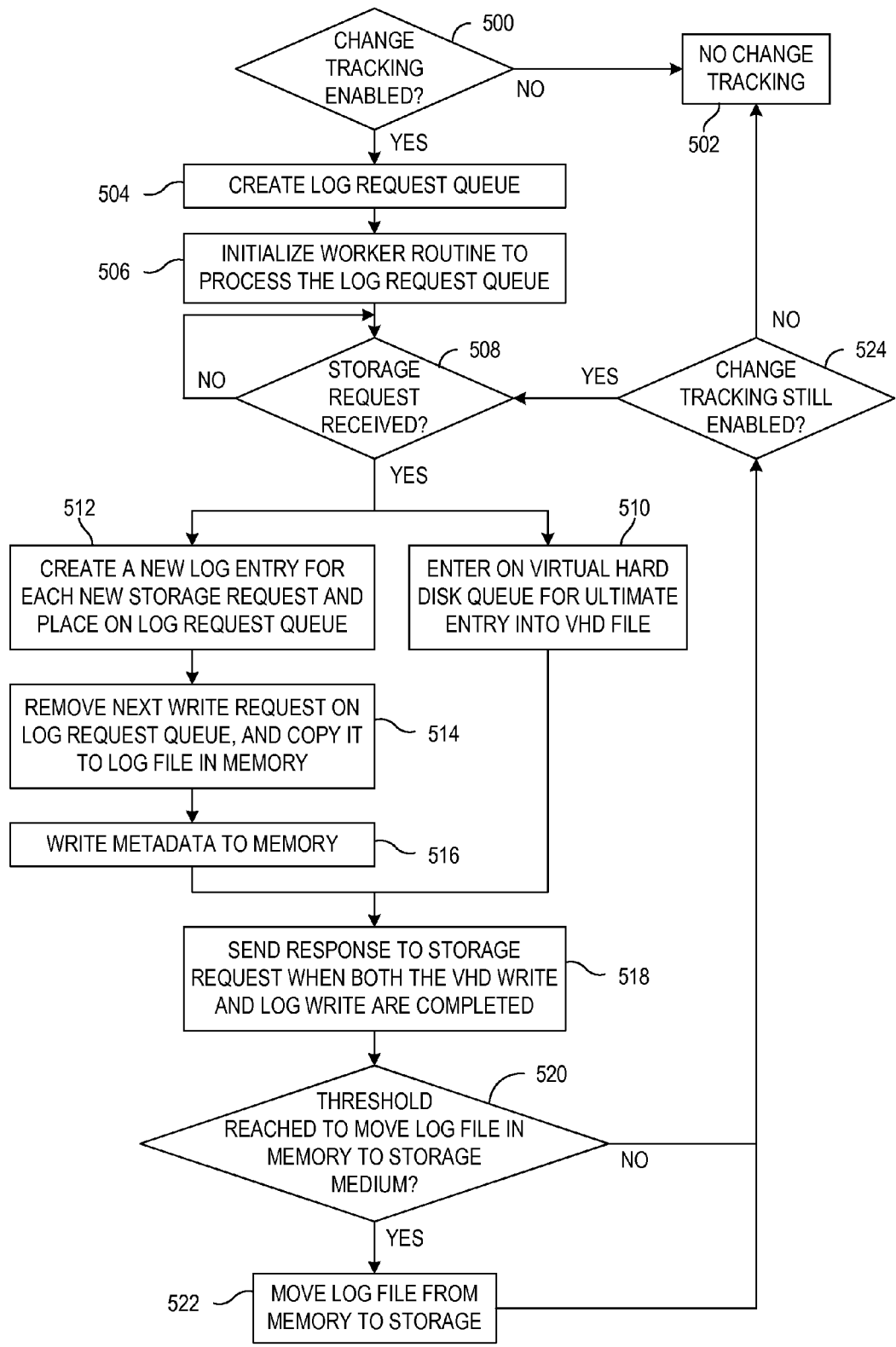
FIG. 5 is a flow diagram of an embodiment for creating replication log files.

FIG. 5 is a flow diagram of an embodiment for creating replication log files. In one embodiment, the VHD parser functionality, such as that provided by the VHD parser 204 of FIG. 2 (e.g. VHDMP.sys), is extended to capture virtual disk writes in a log file(s). As previously notes, one embodiment involves enhancing the VHD parser (e.g. VHDMP.sys) to support IOCTLs to enable and disable tracking virtual disk changes. If change tracking is not enabled as determined at block 500, no change tracking will be implemented as shown at block 502. When VHDMP is enabled for tracking virtual hard disk changes as determined at block 500, a log request queue is created 504. A worker routine is initialized at block 506 to process the log request queue. When a storage request (e.g. SRB) is received as determined at block 508, a request handler enters the request on the virtual hard disk queue for ultimate entry into the VHD file as shown at block 510. A new log entry is created for each new storage request and placed on the log request queue as shown at block 512, substantially in parallel with the processing of the virtual hard disk queue of block 510. The next write request on the log request queue is removed and copied to a log file as shown at block 514. In one embodiment, the log file is stored in system memory, as is associated metadata as shown at block 516.

In one embodiment, the write requests written to the VHD file and the log file are issued contemporaneously within the VHDMP (e.g. by request processing modules 218 and 228 of FIG. 2), but the storage request response is returned to the VM when both the VHD write as well as the log write are completed, as shown at block 518. Since in one embodiment the log file is written to system memory, the writing to the log file is performed faster than performing the VHD write that is sent to disk. Thus, the SRB response time measured inside the VM is not affected by this additional writing to the log file. In one embodiment, failure in writing the log file is considered a tracking failure that does not affect the storage request completion success status; while failure in writing the VHD file is considered a failure regardless of the status of log file write.

In one embodiment, the log file stored in system memory can be directly transmitted to a recovery server(s) from memory. In another embodiment, the log file can be written to a physical storage medium. In these or other scenarios, a condition may dictate when the log file in memory will be stored elsewhere. The condition may be, for example, a time, time duration, triggering event, etc. In the embodiment illustrated in FIG. 5, a condition serves as the criterion in which the log file will be moved from memory to a storage medium, as shown at block 520. For example, the criterion may involve the total size of the logs in the system memory, such that when they reach a threshold size, the logs in memory will be flushed to the log file on a physical medium. Since the write operations to the log file may be batched together in a single write request, it will consume fewer storage I/O operations and have less impact on storage IOPS available to workloads. When the threshold is met, the log file is moved from memory to storage as shown at block 522. If change tracking has not been disabled as determined at block 524, the process may continue as shown at block 508, where it is determined when another storage request is received. Otherwise, change tracking may be disabled as shown at block 502.

In one embodiment, log file flushing from memory to physical storage, as depicted at block 522, can occur as a background operation. In such an embodiment, new storage requests may be written to the buffer in memory while the log file flushing operation is happening. In other embodiments, new storage request processing could be suspended until the log file flushing has completed.

Examples of the log file data and metadata are now described. FIGS. 6A-6E illustrate representative log file and metadata formats. It is noted that the examples of FIGS. 6A-6E are provided as representative examples only, as various alternatives may be provided to provide the information described in this example. It is also noted that in the examples of FIGS. 6A-6E, like reference numbers are used to identify corresponding fields or other items.

A representative log file 600 format is illustrated in FIG. 6A. The representative log file format has three types of fields including a header, metadata and data. In one embodiment, the log file 600 has a header 602 that includes information to at least identify the log file 600, indicate the size of the metadata field 604A, 604B, 604C, and indicate the location of the last valid data of the log file (EOL) 606. The log file 600 includes the data 608A-608H from the write requests (or other storage requests). A representative log file 600 header 602 is shown in FIG. 6B. The header may include header fields 610, size 612 of field, value 614 associated with the field, etc. Various header fields 610 may be provided as shown in FIG. 6B, including the EOL location 615, error code 616, metadata size 617, log file unique ID 618, last modified timestamp 619, and total metadata entries 620, of which some are described in greater detail below.

The error code 616 provides information relating to a reason in which the EOL location may show an invalid value. For example, if the EOL location 615 is a first value corresponding to an invalid EOL location (e.g., value 0), then the log file is considered invalid in one embodiment. This can happen for various reasons, such as a tracking error occurring and thus tracking is marked as failed, or the machine crashed or otherwise failed rendering the log file invalid. Where a tracking error occurred and thus tracking was marked as failed, one embodiment involves storing a reason for that tracking failure in the error code field 616. Another representative field is the last modified timestamp field 619, which includes a time corresponding to the changes to the virtual disk that are captured in this log file. In one embodiment, the total metadata entries field 620 includes the total number of metadata entries present in the entire log file.

Figures 6C, 6D, 6E:
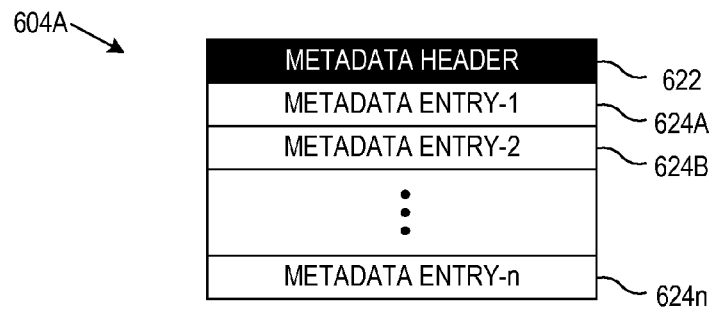

FIG. 6C illustrates an example of the log file metadata format for representative metadata 604A of the log file 600. The metadata includes at least a metadata header 622 and one or more metadata entries 624A, 624B, 624n. FIGS. 6D and 6E depict a representative metadata header 622 format and a representative metadata entry 624A format respectively.

The metadata provides, among other things, information describing the changes to the virtual disk that is the subject of the replication. In FIG. 6D, the metadata header 622 includes fields 630 and the size 638 of the fields 630. The fields 630 include the previous metadata location field 632, which can assist in traversing the metadata structures from the end of log (EOL) 606 of the log file 600. The fields 630 also include a valid metadata entries field 634 that provides information about the valid number of metadata entries in that particular metadata, such as the number of metadata entries 624A through 624n shown in FIG. 6C.

The metadata entries themselves may include fields 640 and a size 650 of the fields 640 as depicted in FIG. 6E. Each metadata entry 624A, 624B, 624n may provide information about the virtual disk address range that is modified. In one embodiment, each metadata entry 624A, 624B, 624n includes a byte offset, 642, data length 644, timestamp 646 and meta operation 648. Since the log file in one embodiment is sequential, the log file offset can be calculated using the data length in the data length field 644. Thus, the first metadata entry 624A follows the log file header 622, and the log file offset for the second metadata entry 624B may be calculated by adding the size of the first metadata entry to the first metadata location. The byte offset field 642 can provide a value that indicates an actual physical address on the virtual disk that was modified, and thus this field 644 value may be used to apply the data back to the virtual disk on the recovery server. In one embodiment, the meta operation field 648 indicates the meta operation of this log entry, where in one embodiment two values are provided including a write operation corresponds to value "1" and a no operation (NOOP) corresponds to a "0).

New data in the changed address range is stored as data entry 608A-608H in the log file 600. The representative log file 600 format facilitates sequential writing. In one embodiment, each metadata describing each data entry is written after a set of data entries is written to the log file. For example, metadata 604C may be written after a set of data entries 609 has been written to the log file 600.

Referring briefly to FIG. 2 in connection with FIGS. 6A-6E, when an SRB 202 or other storage request that changes a virtual disk is received at the virtual disk parser 204, the data associated with the SRB 202 may be written as a data entry at the EOL 606 of the log file 600. A metadata entry 604C is created in the current metadata with the address range specified in the SRB. If the metadata is full, it is written to the log file before processing the next SRB 202. Since in one embodiment the amount of data that goes to the log file 600 is same as the amount of that is changed in the virtual machine, transferring extra tracking data over the network to the target locations can be avoided.

In one embodiment, metadata entries are grouped in batches, and efficiencies in parsing the log file 600 by the virtual disk parser 204 can be achieved with fewer I/O operations. Writing data and corresponding metadata entry one after another in contiguous locations, versus in batches, would involve more I/O operations to parse the log file 600, if the log file 600 is to be parsed before start applying the changes in log file on any virtual disk.

It is possible that the log file and the virtual disk file (e.g. VHD file) will become out of synchronization. Since the log file and virtual disk file are written contemporaneously so that storage request response time is not affected, any failure in writing either the log file or the virtual disk file will make the log file out of sync with the virtual disk file. In one embodiment this is detected using the EOL location field 615 in the log file header 600. Before writing any new data to the log file 600, the EOL location field 615 is set to an invalid value. When a log file is closed, and there is no error, a valid value is entered into the EOL location field 615. If there is an error while writing to either the virtual disk file or the log file, the EOL location field 615 is not updated with a valid value, and the log file becomes invalid indicating that it is not in sync with the virtual disk file. Also if the primary server crashes or otherwise exhibits a failure, the EOL location field 615 will still hold an invalid value as the file was not closed properly. When the log file is examined after the machine is restarted, it will indicate that the log file could not capture all the changes and was out of sync with the virtual disk.

Figure 7A:
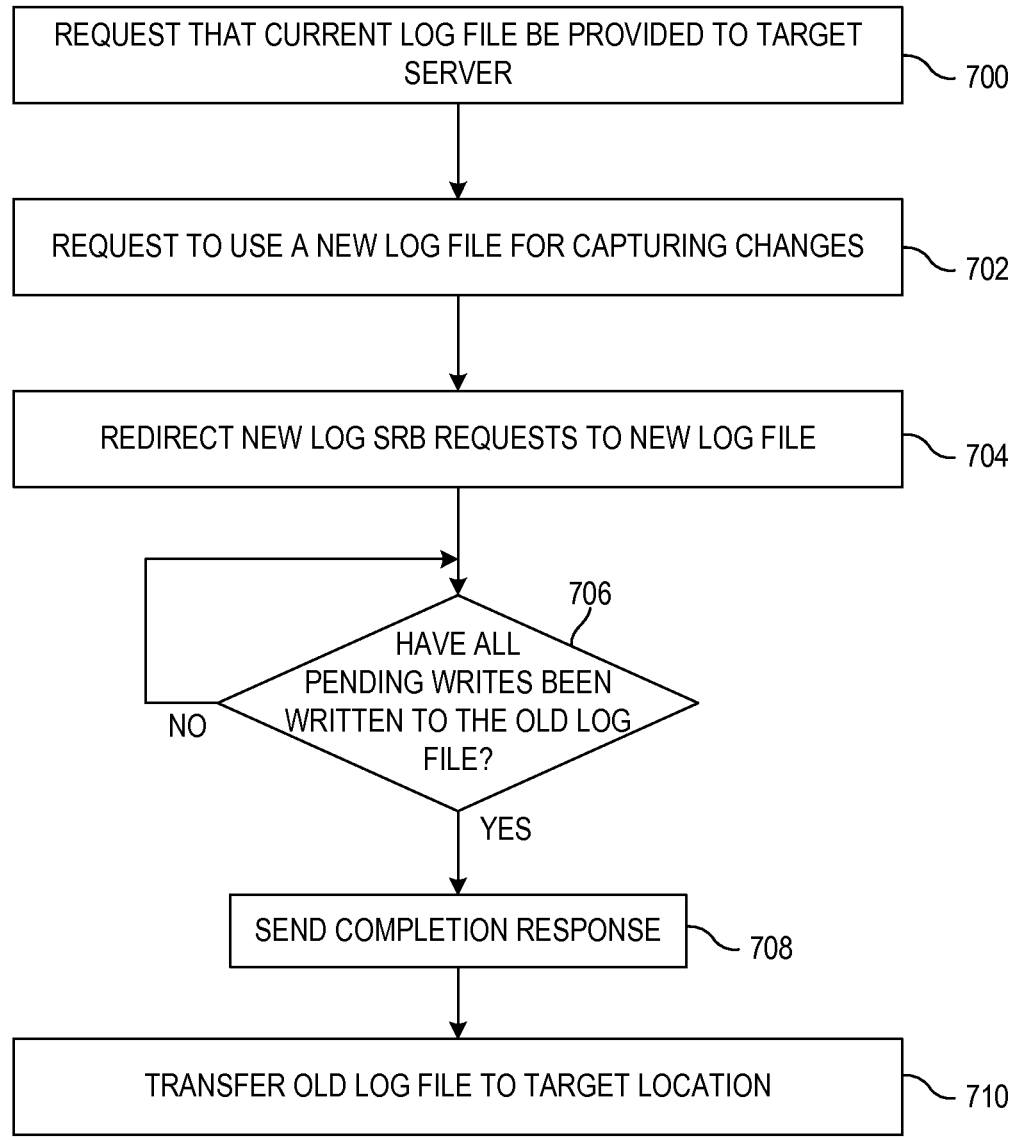
FIGS. 7A and 7B depict representative embodiments for switching to a new log file when a current log file is to be transferred for replication purposes.
Figure 7B:
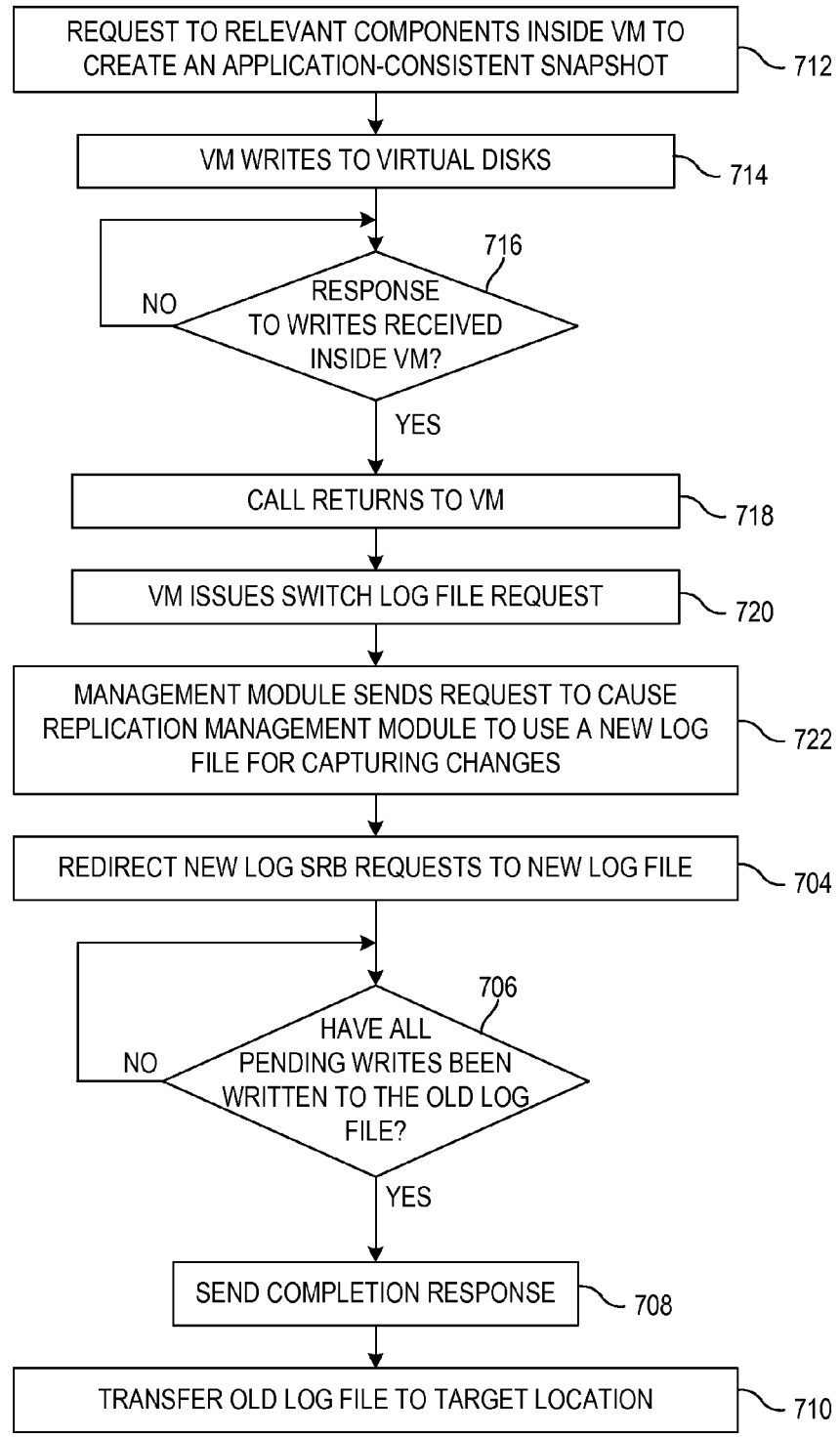

As changes to a virtual machine are accumulated into a log file at a primary server, that log file will at some point be transferred to a recovery server to carry out the replication. FIGS. 7A and 7B depict representative embodiments for switching to a new log file when a current log file is to be transferred for replication purposes. Like reference numbers are used for analogous functions in FIGS. 7A and 7B.

Particularly, FIG. 7A is a flow diagram illustrating one manner of switching to a new log file and sending the prior log file to the intended recipient. At block 700, a virtual machine management service (e.g., VMMS) or other module requests that a set of virtual machine changes in a log file be transferred to a target server. In one embodiment, this request also involves a request for the replication management module to use a new log file for capturing changes, as shown at block 702. When the log file switch request is received, all new log SRB requests are redirected to the new log file as shown at block 704. It may be determined, as shown at block 706, whether all pending writes to the old log file have been completed. For example, a reference count mechanism may be used to keep track of pending writes to the old log file (i.e. the log file to be transferred to the target server). A module, such as the IOCTL handler 208, can wait until the reference count on the old log file becomes a predetermined value (e.g., counts down to zero). When this threshold has been reached, the IOCTL handler 208 can send a completion response for the log file switch request, as shown at block 708. In one embodiment shown at block 710, the old log file will be transferred to the target location after switching to the new log file is successful.

Embodiments also provide application-consistent snapshot support, which generally refers to a snapshot of the virtual storage of the running system that has prepared itself to have a copy obtained. Where the storage is prepared in this fashion, the snapshot is coherent in that it facilitates a high likelihood of successful reanimation at the replication site. Thus, application-consistent points in time may be generated for the replicated copy of the virtual machine. For example, an application-consistent snapshot may be obtained using an operating system service such as the volume shadow copy service (VSS) by MICROSOFT® Corporation that coordinates between the backup functionality and the user applications that update data on the disk. The running software (i.e., the data writers) can be notified of an impending copy, and bring their files to a consistent state. This type of copy may provide a higher likelihood of proper reanimation at a recovery server, relative to an unprepared copy (e.g., crash-consistent copy) of the virtual storage.

FIG. 7B is a flow diagram illustrating one manner of switching to a new log file where an application-consistent snapshot is to be obtained of the current log file that is to be transferred. A management module, such as a VMMS, may make a request to particular components inside a VM to create an application-consistent snapshot, as shown at block 712. When the application-consistent snapshot is taken inside the VM, block 714 shows that writes will be issued to the virtual disks. When a response to these writes are received inside the VM as determined at block 716, the call will return to the VM at block 718, and the VM will issue a switch log file request as shown at block 720. Since a response to the VM write operations is sent after the corresponding writes to the log file are completed, all required changes will be present in the log file that is to be transferred for recovery purposes in one embodiment.

When the VM (or other module) has indicated that a log file switch can be made, the management module may send a request to cause the replication management module (e.g., virtual disk parser 204) to use a new log file for capturing changes. From this point, the process may correspond to that of FIG. 7A. For example, all new log storage (e.g., SRB) requests are redirected to the new log file as shown at block 704. It may be determined, as shown at block 706, whether all pending writes to the old log file have been completed. When this threshold has been reached, a completion response may be sent for the log file switch request, as shown at block 708. The old log file will be transferred to the target location after a successful switch to the new log file, as shown at block 710.

Figure 8:
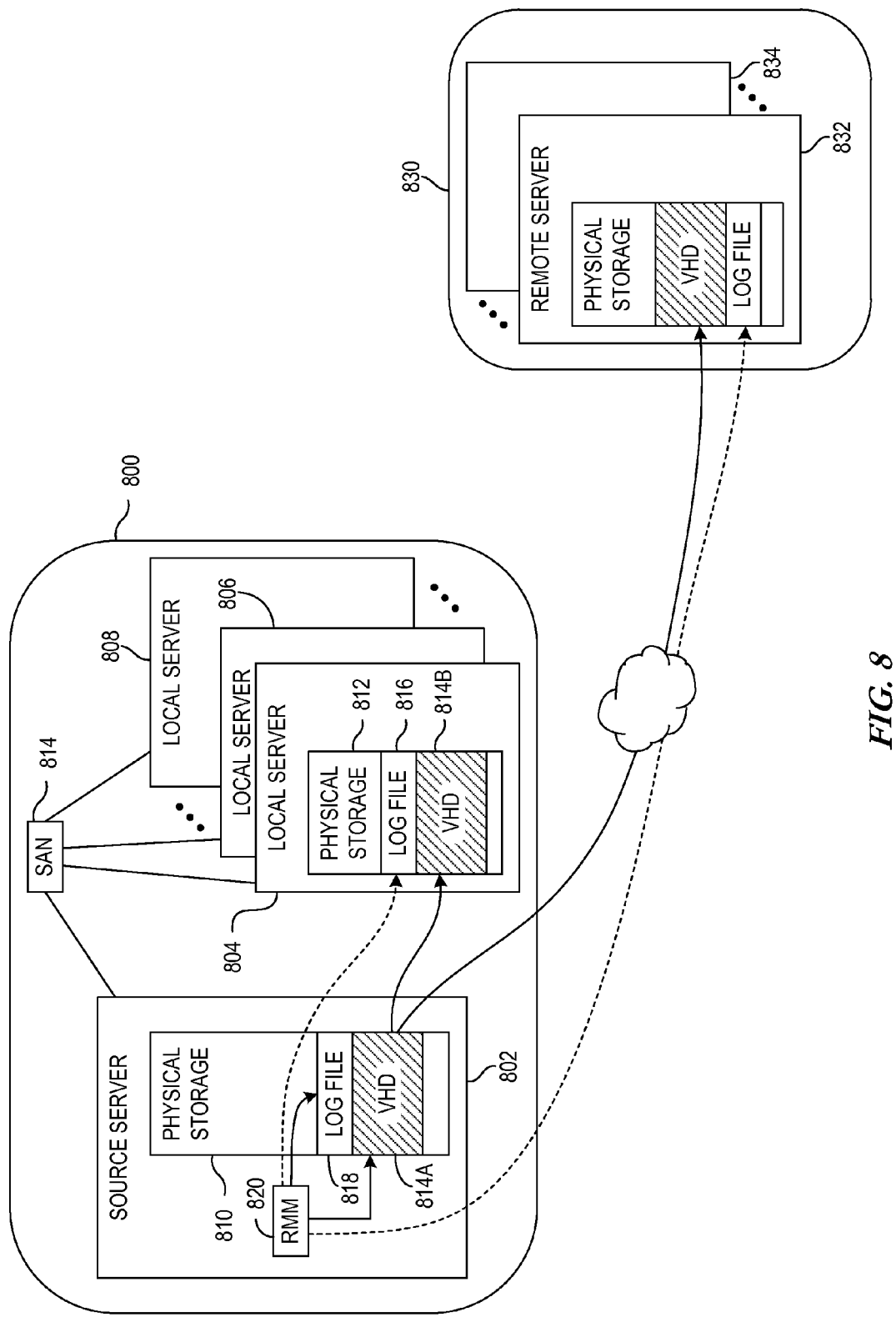
FIG. 8 is a block diagram generally illustrating the use of log files in view of storage migration.

A virtual disk storage location can dynamically change while a virtual machine is running. This is generally referred to as storage migration, which is commonly used for optimizing resource consumption, for maintenance, etc. FIG. 8 is a block diagram generally illustrating the use of log files in view of storage migration. Migration of storage may be, for example, between servers at the same site 800, such as between a source server 802 and at least one of the other local servers 804, 806, 808. Each server may have its own physical storage 810, 812 to store virtual storage, or the storage may be shared or other storage available via a storage area network (SAN) 814. Migration of storage could also occur to a remote site 830 that includes one or more remote servers 832, 834. The log file techniques described herein can facilitate change tracking across storage migrations.

In accordance with one embodiment, when storage migration is in process, a new log file is created in the storage migration target location. For example, assume that a virtual hard disk (VHD) 814A stored at the storage 810 of the source server 802 is migrating to the storage 812 of server 804 at the same site 800, as depicted by VHD 814B. A new log file 816 is created in the storage 812 of the migration target, which is server 804 in this example.

In one embodiment, all write requests that are being captured into the source log file 818 are duplicated by the replication management module (RMM) 820, and provided to the target log file 816. The custom data structure instance that represents the duplicated log write request (e.g., duplicated SRB) will point to the target log file 816, and the log processing routine automatically writes this log information to that target file. Once the storage migration is completed, the new log file 816 at the new server 804 can begin being used. In this manner, no changes are missed even when the virtual disk migrates to a new storage location.

Figure 9:
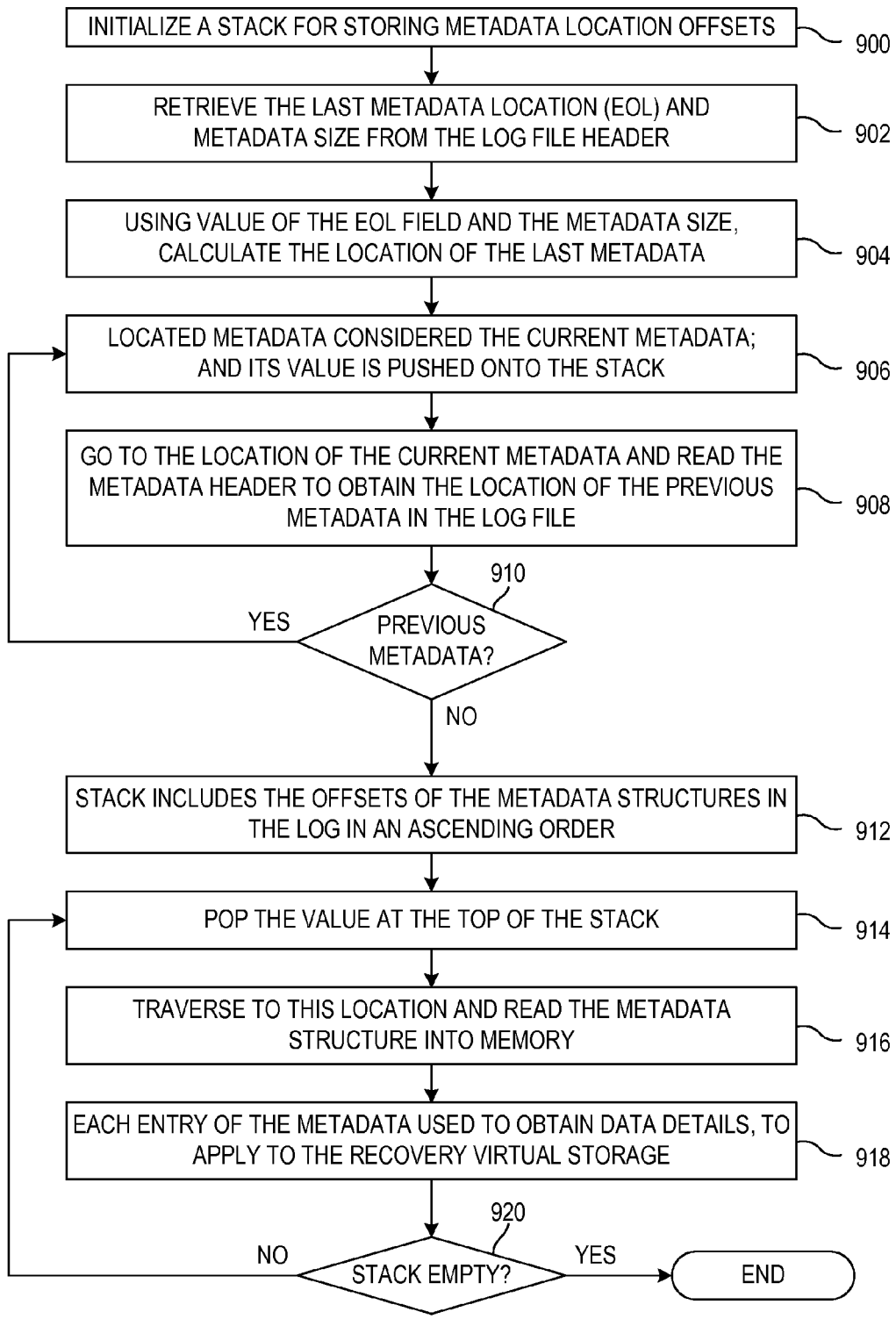
FIG. 9 is a flow diagram illustrating a representative manner in which a recovery server can apply virtual machine changes recorded in a log file to the replicated virtual machine to make it correspond to the virtual machine that it is replicating.

When a log file has been provided to a target system, it can be used to update a replicated virtual machine at that target system. For example, a primary server at a primary site can generate log files as described above. Those log files can be transmitted to a recovery server at an off-site location to facilitate disaster recovery efforts. In one embodiment, the recovery server applies the changes made to the primary server's virtual machine by updating a replicated virtual machine on the recovery server using the received log files. FIG. 9 is a flow diagram illustrating a representative manner in which a recovery server or other target device can apply those changes to the replicated virtual machine to make it correspond to the virtual machine that it is replicating. Any of FIGS. 6A-6E may be referenced in connection with the description of FIG. 9.

A stack may be initialized for storing metadata location offsets, as shown at block 900. Block 902 involves reading the log file header 602 to obtain the location of the end of log (EOL) 606 from field 615, and the metadata 604A/B/C size from field 617. Block 904 shows that the value of the EOL field 615 and the value of the metadata size field 617 are used to calculate the location of the last metadata of the log file 600, shown as metadata 604C in FIG. 6A. For example, the location of the last metadata 604C in the log file 600 would be equal to the EOL location (i.e. address) minus the value in the metadata size field 617. This would provide a location at which the metadata 604C begins. It should be noted that the present example assumes metadata that follows (from an addressing point of view) its associated data in the log file 600, else such a calculation would also subtract the data size to which the metadata is associated.

The located metadata 604C is considered at least temporarily to be the "current metadata," and its value is pushed onto the initialized stack as shown at block 906. At block 908, the metadata header 622 is read from the location of the "current metadata" (which at this time is the location of the last metadata 604C), and the location of the previous metadata 608B in the log file 600 is obtained. More particularly, the previous metadata field 632 of the metadata header 622 provides the address of the previous metadata 608B. As determined at block 910, if a previous metadata location exists in the field 632 (i.e. the current metadata is not the first metadata of the log file 600), processing returns to block 906 where the newly identified metadata 608B is considered the "current metadata" and its value is pushed onto the stack. This continues as until the last metadata, which is metadata 604A in the example of FIG. 6A, is at the top of the stack. When this occurs, the offsets of the metadata structures 604A, 604B, 604C are on the stack in an ascending order, as depicted at block 912.

With this stack at the recover server now having the metadata offsets retrieved from the log file 600, the recovery server can begin to replicate the virtual storage using the data 608A-608H in the log file 600. Particularly, the value at the top of the stack is obtained as shown at block 914. The metadata structure is read by traversing to the location of the metadata obtained from the stack as shown at block 916. As was depicted at FIGS. 6C and 6E, metadata entries 624A, 624B through 624n include the details of a data field in the log file 600 that can be read from the log file 600 and applied to the recovery virtual storage as depicted at block 918.

For example, each metadata 624A, 624B through 624n provides the length of the data written in the log, as shown at data length field 644 of FIG. 6E. As the data (e.g. data 608F, 608G, 608H) are written sequentially, the start of a data field 608H may immediately follow the end of an immediately preceding data field 608G, the end of the log file header 602, or the previous metadata header 604B. With this information, the start of each data 608F-608H can be obtained in order to read that data 608F-608H pointed to by metadata structure 604C. If the stack is not empty at determined at block 920, processing returns to block 914 where the next value (now at the top of the stack) is popped, its metadata read at block 916, and its data read at block 918. This continues until the stack is empty as determined at block 920, which indicates that all of the data has been read from the log file 600.

Figure 10:
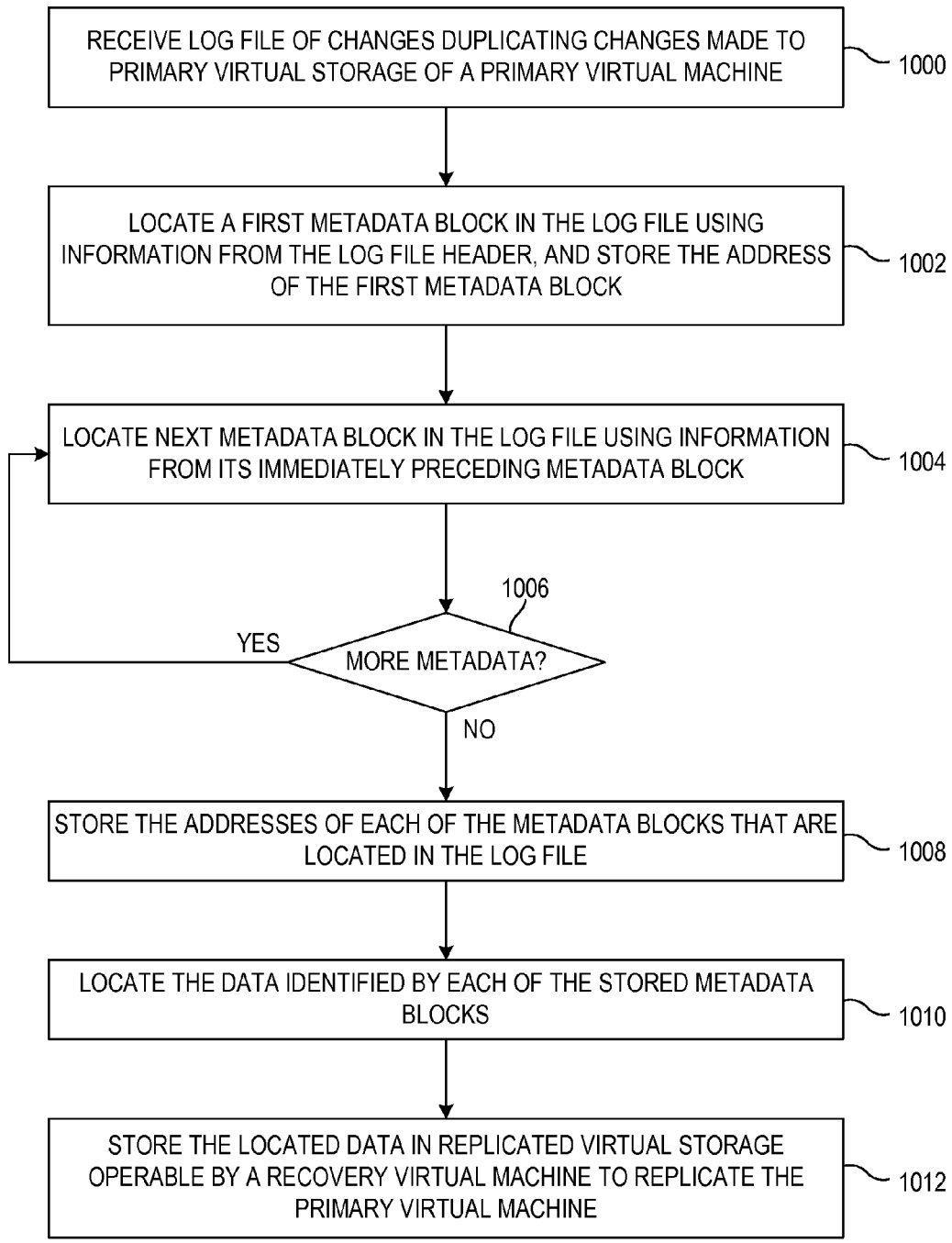
FIG. 10 is a flow diagram of an embodiment in which a recovery server applies primary virtual machine changes to the replicated virtual machine.

FIG. 10 is a flow diagram of another embodiment in which a recovery server applies primary virtual machine changes to the replicated virtual machine. This embodiment may be a computer-implemented embodiment for facilitating replication of virtual machines. The computer-implemented method includes, as shown at block 1000, receiving a log file of changes duplicating changes made to primary virtual storage of a primary virtual machine. In one embodiment, the file includes a log file header, blocks of data that changed in the primary virtual storage, and metadata blocks to specify locations of the data in the log file. A first metadata block is located in the log file using information from the log file header, and the address of the first metadata block is stored as shown at block 1002. One or more additional metadata blocks in the log file are located, each metadata block being located using information from its respectively preceding one of the metadata blocks in the log file. For example, block 1004 depicts that the next metadata block in the log file may be located using information from its immediately preceding metadata block. If there is more metadata in the log file as determined at block 1006, the next metadata block is again located at block 1004. This continues until no further metadata is in the log file.

The addresses of each of the metadata blocks located in the log file are stored, as shown at block 1008. In one embodiment, the metadata blocks are pushed onto a stack, although they may be stored in any fashion. The stored metadata blocks are then used to locate the data identified by those metadata blocks, as shown at block 1010. Block 1012 shows that the located data is stored in replicated virtual storage operable by a recovery virtual machine to replicate the primary virtual machine.

In one embodiment, the log file may be received at block 1000 by a receiver, such as a stand-alone receiver, transceiver, network interface, or other receiving mechanism. A processor may be used in connection with software instructions to locate the first and next metadata blocks shown at blocks 1002, 1004. The processor may also be used to determine whether there is more metadata to be located in the log file, as determined at block 1006. The processor can direct the storing of the addresses of the metadata blocks described at block 1008, where the addresses may be stored to memory, storage, etc. As previously noted, one representative manner of storing such metadata addresses is to push them onto a stack. The processor may assist in locating the data identified by each of the stored metadata blocks shown at block 1010. The processor may perform the functions of block 1012 to store the located data in replicated virtual storage.

Solutions described herein also contemplate enabling recovery of a virtual machine at a recovery site from a desired time. For example, if a plurality of log files are provided to a recovery site, recovery may be initiated from a desired one of the log files that corresponds to a particular time, and therefore state of the virtual machine. In one embodiment, when a log file described herein is applied to a recovery server virtual disk, a new log file may be generated on the recovery server that captures the current set of changes made to the virtual disk. This new log file generated on the recovery server(s) is referred to herein as an undo log. An undo log as described herein may be used to revert the data in the virtual disk to some prior time. As described below, in one embodiment the same format used for log files is used for undo log files as well, but the logs may be applied in reverse chronological order to revert the virtual disk data to a particular time. In one embodiment, these "undo logs" are not generated where workloads are running, but rather are generated in replication target locations as described below.

More particularly, the use of log files as described herein provides an option for the user to maintain multiple recovery points on a recovery server(s). Each recovery point can represent a snapshot or other copy of storage at a particular prior point in time. Differencing disks used for accessing prior recovery or reversion points may be inefficient in terms of IOPS, as one write operation can lead to multiple IOPS, such as differencing disk metadata operations, actual write operations, virtual disk expansion and extra IOPS due to merge operations. Among other things, the use of undo logs as described herein mitigates storage IOPS degradation. Further, the storage requirements using undo logs as a manner of reaching desired recovery points are significantly lower relative to the use of differencing disks. The amount of storage utilized when using undo logs as described herein scales substantially linearly to the amount of changes that are to be stored over that recovery window. On the other hand, in the case of differencing disks, the storage requirement scales in a non-linear fashion.

Figure 11:
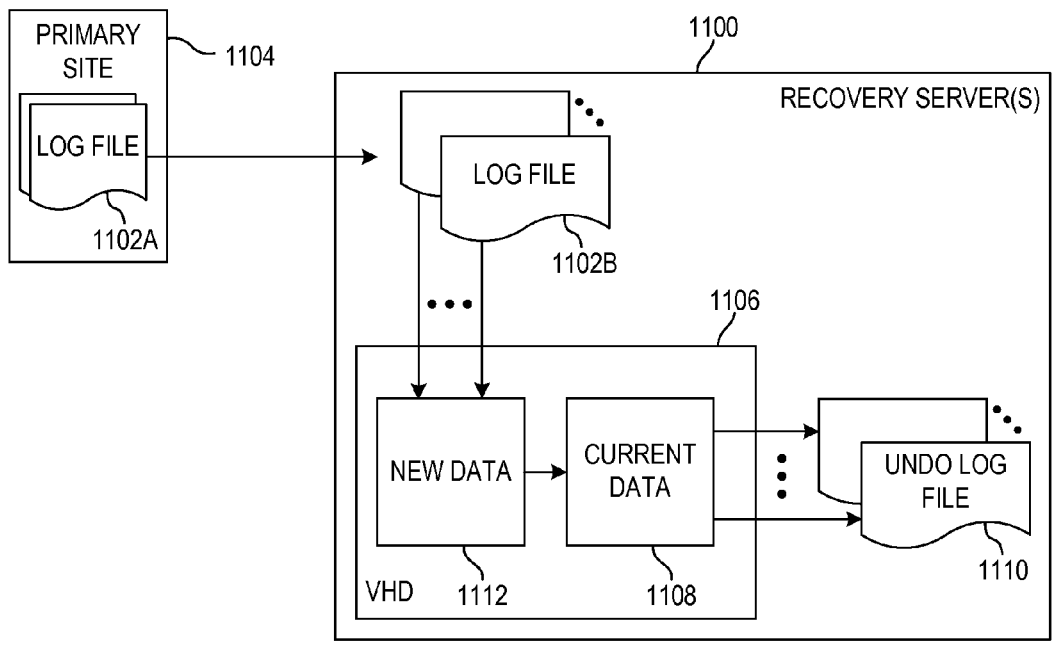
FIG. 11 is a block diagram illustrating an exemplary use of one or more undo log files at a recovery site.

Referring to FIG. 11, a block diagram illustrates the use of one or more undo log files at a recovery site including one or more recovery servers 1100. Log files 1102A, such as those previously described, are provided by a primary site 1104 to the recovery server 1100 as depicted by log files 1102B. When a change tracking log file 1102B is applied on virtual disks (e.g. VHD 1106) in the recovery server 1100, the current data 1108 in the recovery server VHD 1106 may be captured inside a new log file; i.e. the undo log file 1110. In one embodiment, the format of this undo log file 1110 is the same as the log file 1102A/1102B that is used for capturing changes in the replication primary server 1104. When the log file 1102A that is transferred from primary server 1104 and received as log file 1102B at the recovery server 1100 is read, and a write operation is to be issued to a virtual disk 1106 on the recovery server 1100, the current data 1108 in the virtual disk 1106 at the same virtual disk offset is read. A new log is added to the "undo log" file 1110 that captures information such as the disk offset, write request length, etc., and the prior timestamp from the log file 1102B and data that is read from virtual disk 1106 are preserved. The disk offset and write request length goes to the metadata portion of the undo log file 1110 and data goes to data portion of the undo log file 1110. In one embodiment, the resultant undo log file 1110 will have its log entries sorted by their timestamp field. The new data 1112 from the log file 1102B can then become the current data 1108 for subsequent generation of additional undo log entries if desired.

Figure 12:
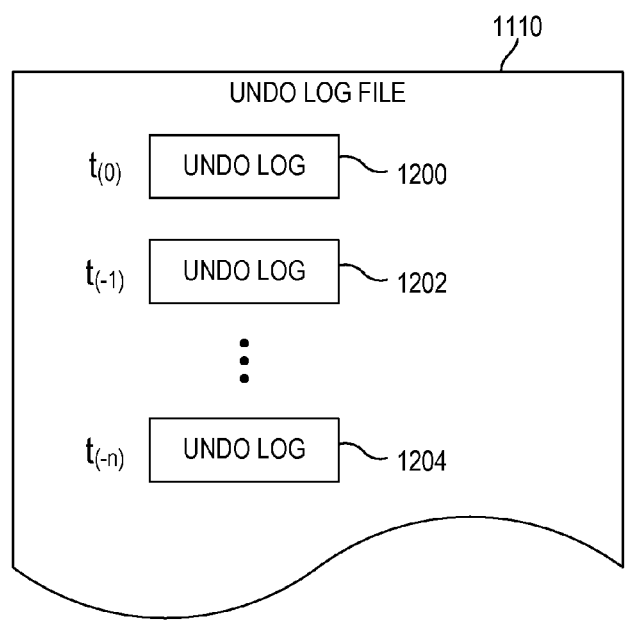
FIG. 12 depicts an exemplary undo log file.

FIG. 12 depicts an exemplary undo log file, such as undo log file 1110 of FIG. 11, illustrating that logs in the undo log file may be stored in a chronological order. As noted above, in one embodiment log entries are sorted by their timestamp field, resulting in undo logs 1200, 1202, 1204 being sorted in chronological or reverse chronological order, $t_{(0)}, t_{(-1)} \ldots t_{(-n)}$. In one embodiment, the format of the undo log file 1110 may be analogous to that of a log file, such as the log file 600 shown in FIG. 6A. If an administrator or other user chooses to revert a virtual disk (e.g. VHD 1106) to some earlier point in time, the undo log file 1110 may be used. In this case, logs 1200, 1202, 1204 in the undo log file 1110 are applied in reverse chronological order using timestamp field in log metadata. Since in one embodiment the log entries 1200, 1202, 1204 in undo log file 1110 are already sorted on their timestamp field, the undo log entries 1200, 1202, 1204 in the undo log file 1110 may be read in reverse chronological order. Write requests may be issued to the virtual disk (e.g. VHD 1106) using disk offset, length and data information in the individual undo logs 1200, 1202, 1204. If the administrator or other user chooses to revert the undo log file 1100 to a time T1, the timestamp field in undo log metadata entry can be compared to the value T1. If the timestamp field is greater than T1, the log will be applied to the virtual disk. Further processing may end when an undo log entry that has timestamp less than T1 is found.

Figure 13:
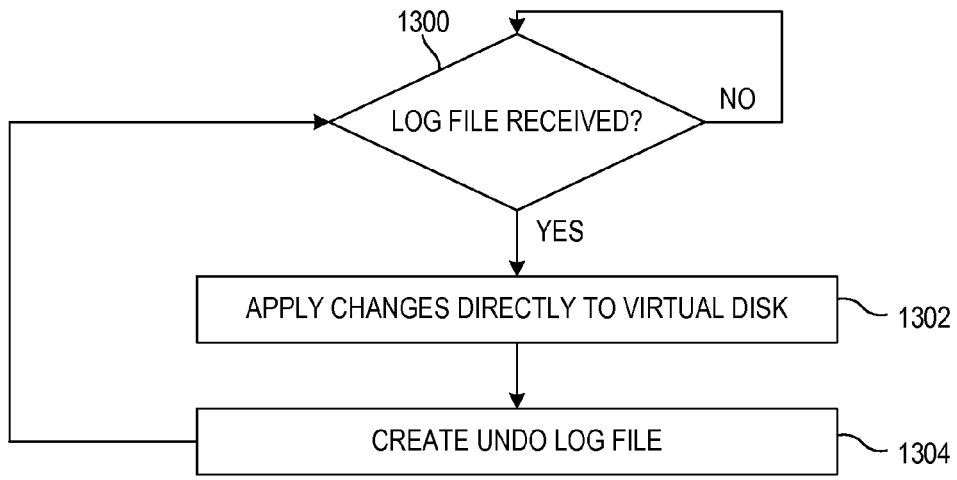
FIGS. 13 and 14 illustrate an example of creating and using an undo log file.
Figure 14:
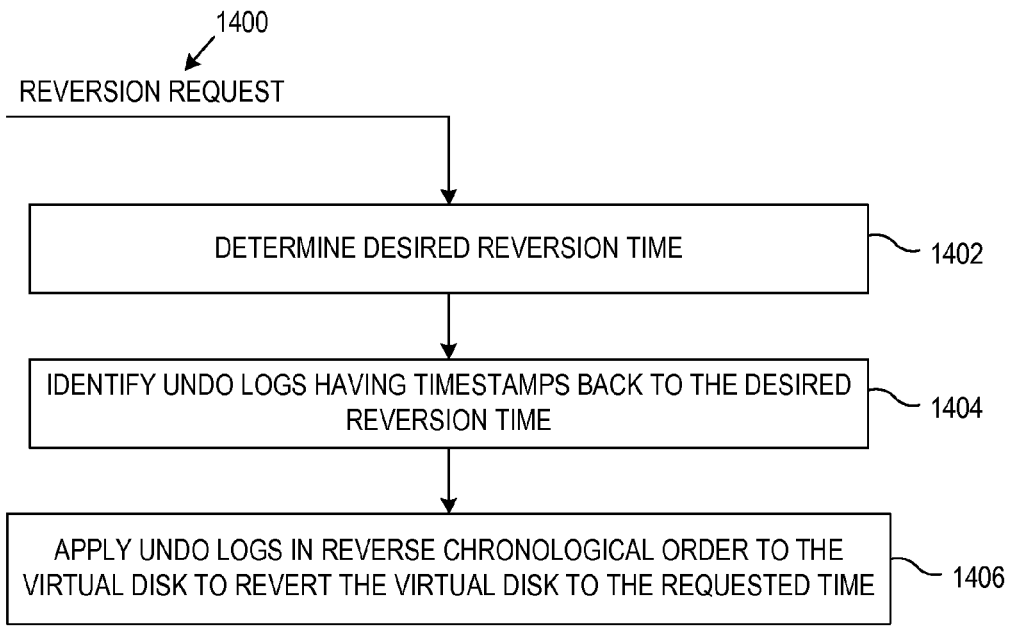

FIGS. 13 and 14 illustrate an example of creating and using an undo log file. Referring to FIG. 13, when a log file is received at a recovery server as shown at block 1300, it can be applied directly to the virtual disk as shown at block 1302. Using this approach, changes may be directly applied to the original virtual disk, while an undo log file is also created as shown at block 1304. In one embodiment, the undo log file is created substantially contemporaneously with the application of the log file changes to the virtual disk. Thus, when a log file is applied to a recovery server virtual disk, a new undo log file may be generated on the recovery server that captures the current set of changes made to virtual disk.

When a user wants to revert to a particular point in time of the virtual disk, a reversion request 1400 may be provided to indicate at least the point in time in which the recovery virtual disk is to be reverted. The desired reversion time may be determined as depicted at block 1402. In one embodiment, undo logs having timestamps back to the desired reversion time are identified as shown at block 1404. For example, if an administrator chooses to revert the log file to a time T1, the timestamp field in log metadata entries can be compared to the value T1, and those having a timestamp greater than T1 can be applied to the virtual disk. In one embodiment shown at block 1406, the undo logs are applied in reverse chronological order to the virtual disk to revert the virtual disk to the requested time.

In one embodiment, applying a log to revert to a particular time (e.g., time T1) involves once again storing the information in a similar undo log file so that this change can also be reverted. Thus, creation of an undo log when reverting to a prior time such as T1 allows the user to disregard the attempted reversion to time T1. As a result, the user could revert and "un-revert" back and forth in time until the user is satisfied with the recovery time choice.

Using an undo logs approach as described herein, it can be seen that there is no impact on workload performance. A workload could provide an undo feature by generating separate logs while modifying their data. However, since such logs would be generated where the workload is running, it would impact the workload performance due to additional log writes, and/or involve overprovisioning of storage. In the proposed approach, the undo logs are not generated on primary server where workload is currently running, and therefore there is no overhead on active workloads to have multiple recovery points.

As demonstrated in the foregoing examples, the embodiments described herein facilitate disaster recovery and other replication features. In various embodiments, method are described that can be executed on a computing device, such as by providing software modules that are executable via a processor (which includes a physical processor and/or logical processor, controller, etc.). The methods may also be stored on computer-readable media that can be accessed and read by the processor and/or circuitry that prepares the information for processing via the processor. Having instructions stored on a computer-readable media as described herein is distinguishable from having instructions propagated or transmitted, as the propagation transfers the instructions versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Figure 15:
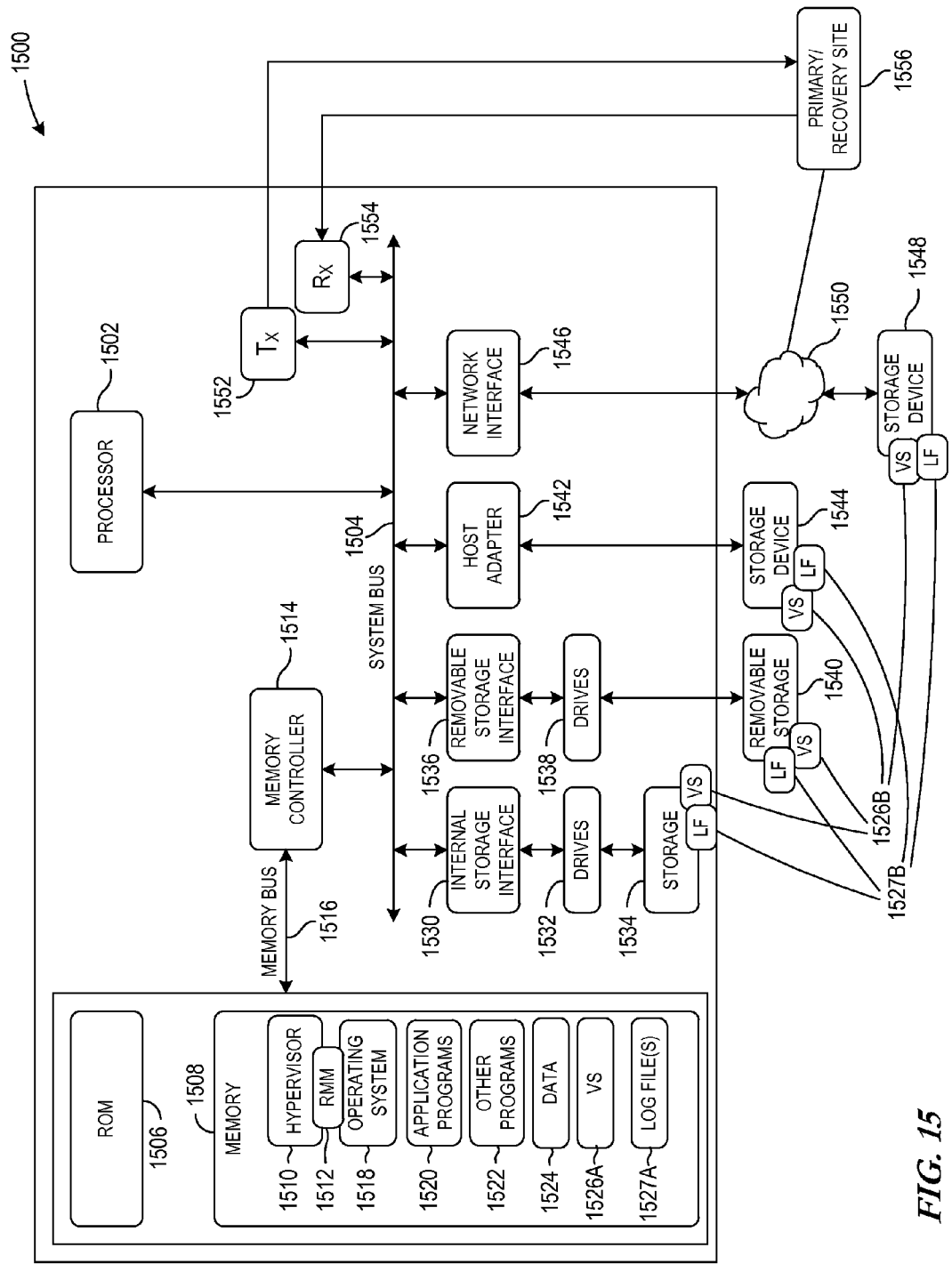
FIG. 15 depicts a representative computing system for a source or recovery server in which the principles described herein may be implemented.

FIG. 15 depicts a representative computing system 1500 in which the principles described herein may be implemented. The computing environment described in connection with FIG. 15 is described for purposes of example, as the structural and operational disclosure for replicating storage or virtual storage is applicable in any computing environment. The computing arrangement of FIG. 15 may, in some embodiments, be distributed across multiple devices. Further, the description of FIG. 15 may represent a server or other computing device at a primary site, or recovery or other destination site.

The representative computing system 1500 includes a processor 1502 coupled to numerous modules via a system bus 1504. The depicted system bus 1504 represents any type of bus structure(s) that may be directly or indirectly coupled to the various components and modules of the computing environment. Among the various components are storage devices, any of which may store the subject to the replication.

A read only memory (ROM) 1506 may be provided to store firmware used by the processor 1502. The ROM 1506 represents any type of read-only memory, such as programmable ROM (PROM), erasable PROM (EPROM), or the like. The host or system bus 1504 may be coupled to a memory controller 1514, which in turn is coupled to the memory 1508 via a memory bus 1516. The exemplary memory 1508 may store, for example, all or portions of a hypervisor 1510 or other virtualization software, an operating system 1518, and a module, such as a replication management module (RMM) 1512 that performs at least those functions described herein. The RMM 1512 may be implemented as part of, for example, the hypervisor 1510 and/or operating system 1518, as may other management modules such as a VMMS (not shown).

The memory may also store application programs 1520 and other programs 1522, and data 1524. Additionally, all or part of the virtual storage 1526A may be stored in the memory 1508. However, due to the potential size of the virtual storage disks, one embodiment involves storing virtual storage disks in storage devices versus memory, as depicted by the virtual storage 1526B associated with any one or more of the representative storage devices 1534, 1540, 1544, 1548. The virtual storage 1526A in the memory 1508 may also represent any part of the virtual storage that is temporarily cached or otherwise stored in memory as an intermediate step to being processed, transmitted, or stored in a storage device(s) 1534, 1540, 1544, 1548.

The memory may store the queues (not shown), including one or both of the virtual disk storage request queue and the log request queue. The memory may also store the log files 1527A described herein. The log files may be stored in memory 1508 until being transmitted to a recovery site, or until being stored in storage, etc. For example, one embodiment involves storing log files in storage devices instead of memory, or perhaps after being stored in memory, as depicted by the log file (LF) 1527B associated with any one or more of the representative storage devices 1534, 1540, 1544, 1548.

FIG. 15 illustrates various representative storage devices in which data, virtual storage, and/or log files may be stored. For example, the system bus may be coupled to an internal storage interface 1530, which can be coupled to a drive(s) 1532 such as a hard drive. Storage media 1534 is associated with or otherwise operable with the drives. Examples of such storage include hard disks and other magnetic or optical media, flash memory and other solid-state devices, etc. The internal storage interface 1530 may utilize any type of volatile or non-volatile storage. Data, including virtual hard disks (e.g., VHD files) and log files may be stored on such storage media 1534.

Similarly, an interface 1536 for removable media may also be coupled to the bus 1504. Drives 1538 may be coupled to the removable storage interface 1536 to accept and act on removable storage 1540 such as, for example, floppy disks, optical disks, memory cards, flash memory, external hard disks, etc. Virtual storage files, log files, and other data may be stored on such removable storage 1540.

In some cases, a host adaptor 1542 may be provided to access external storage 1544. For example, the host adaptor 1542 may interface with external storage devices via small computer system interface (SCSI), Fibre Channel, serial advanced technology attachment (SATA) or eSATA, and/or other analogous interfaces capable of connecting to external storage 1544. By way of a network interface 1546, still other remote storage may be accessible to the computing system 1500. For example, wired and wireless transceivers associated with the network interface 1546 enable communications with storage devices 1548 through one or more networks 1550. Storage devices 1548 may represent discrete storage devices, or storage associated with another computing system, server, etc. Communications with remote storage devices and systems may be accomplished via wired local area networks (LANs), wireless LANs, and/or larger networks including global area networks (GANs) such as the Internet. Virtual storage files, log files, and other data may be stored on such external storage devices 1544, 1548.

As described herein, the primary and recovery servers communicate information, such as log files. Communications between the servers can be implemented by direct wiring, peer-to-peer networks, local infrastructure-based networks (e.g., wired and/or wireless local area networks), off-site networks such as metropolitan area networks and other wide area networks, global area networks, etc. A transmitter 1552 and receiver 1554 are depicted in FIG. 15 to depict the computing device's structural ability to transmit and/or receive data in any of these or other communication methodologies. The transmitter 1552 and/or receiver 1554 devices may be stand-alone components, may be integrated as a transceiver(s), may be integrated into or already-existing part of other communication devices such as the network interface 1546, etc. Where the computing system 1500 represents a server or other computing device at the primary site, all or part of the virtual disk or other stored data to be replicated may be transmitted via the transmitter 1552, whether it is a stand-alone device, integrated with a receiver 1554, integral to the network interface 1546, etc. Analogously, where the computing system 1500 represents a server or other computing device at the recovery site, all or part of the virtual disk or other stored data to be replicated may be received via the receiver 1554, whether it is a stand-alone device, integrated with a transmitter 1552, integral to the network interface 1546, etc. As computing system 1500 can represent a server(s) at either the primary or recovery site, block 1556 represents the primary or recovery server(s) that is communicating with the computing system 1500 that represents the other of the primary or recovery server(s).

As demonstrated in the foregoing examples, the embodiments described herein facilitate disaster recovery and other replication features. In various embodiments, methods are described that can be executed on a computing device, such as by providing software modules that are executable via a processor (which includes a physical processor and/or logical processor, controller, etc.). The methods may also be stored on computer-readable media that can be accessed and read by the processor and/or circuitry that prepares the information for processing via the processor. Having instructions stored on a computer-readable media as described herein is distinguishable from having instructions propagated or transmitted, as the propagation transfers the instructions versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An apparatus comprising:
    a virtual machine configured to provide storage access requests targeting a virtual disk;
    a storage request processing module coupled to the virtual machine to receive the storage access requests and update the virtual disk as directed by the storage access requests;
    a replication management module coupled to the virtual machine to receive the storage access requests in parallel with the storage request processing module, and store information associated with the storage access requests in at least one log file; and
    a transmitter configured to transfer the at least one log file to a destination as a recovery replica of at least a portion of the virtual disk.

2. The apparatus of claim 1, wherein the storage request processing module comprises:
    a virtual disk request queue configured to queue the storage access requests as they arrive;
    a virtual disk request processing module configured to update the virtual disk with data associated with each entry of the virtual disk request queue; and
    wherein the replication management module comprises:
    a log request queue configured to queue the storage access requests issued by the virtual machine contemporaneously with the queuing of the storage access requests in the virtual disk request queue; and
    a log file request processing module configured to update the at least one log file with the information from the storage access requests in the log request queue.

3. The apparatus of claim 2, further comprising a virtual disk parser module including both the virtual disk request queue and the log request queue.

4. The apparatus of claim 1, further comprising a memory coupled to the replication management module to store the at least one log file.

5. The apparatus of claim 4, further comprising a storage write control module configured to initiate transfer of the at least one log file from the memory to physical storage in response to occurrence of a defined triggering event.

6. The apparatus of claim 1, wherein the log file includes a data structure comprising:
   a log file header including an address of an end of the log file and a size of metadata blocks in the log file;
   a plurality of metadata blocks, each including a metadata header and one or more metadata entries, wherein the metadata header includes a location of a previous metadata block, and each metadata entry includes a location and length of the data associated with each metadata block; and
   a plurality of data blocks reflecting the updates to the virtual disk.

7. Computer-readable media having instructions stored thereon which are executable by a computing system for performing functions comprising:
   queuing write requests issued by a primary virtual machine in a first queue;
   queuing the write requests issued by the primary virtual machine in a second queue in parallel with the queuing of the write requests in the first queue;
   updating data in a virtual disk utilized by the primary virtual machine using the write requests from the first queue;
   updating a log file using the write requests in the second queue; and
   transferring the log file for use in generating a replicated virtual disk accessed by a recovery virtual machine.

8. The computer-readable media of claim 7, wherein the stored instructions are executable by the computing system for performing further functions comprising:
   requesting that the log file be transferred for use by the recovery virtual machine;
   redirecting new write requests to a new log file;
   writing write requests that were pending when the new log file was created to the log file to be transmitted;
   providing a completion response when the write requests that were pending when the new log file was created are all written to the log file to be transmitted; and
   enabling transfer of the log file subject to the request for transfer in response to the completion response.

9. The computer-readable media of claim 7, wherein the stored instructions are executable by the computing system for performing further functions comprising:
   requesting an application-consistent snapshot of one or more components operating with the primary virtual machine;
   completing write operations to the virtual disk as a result of the application-consistent snapshot; and
   wherein requesting that the log file be transferred is enabled in response to completion of the write operations resulting from the application-consistent snapshot.

10. The computer-readable media of claim 7, wherein the stored instructions are executable by the computing system for performing further functions comprising:
    creating a second log file at a target server in response to a migration of the primary virtual machine to the target server;
    updating the second log file using duplications of the write requests that are being used to update the log file; and
    utilizing the second log file in connection with a second virtual machine at the target server upon completion of the migration.

11. The computer-readable media of claim 7, wherein the executable instructions further cause the log file to be stored in memory as it be being updated.

12. The computer-readable media of claim 11, wherein the executable instructions further cause the log file to be transferred from the memory to an address of the recovery virtual machine.

13. The computer-readable media of claim 11, wherein the executable instructions further cause the log file to be transferred from the memory to physical storage in response to an occurrence of a predetermined triggering event.

14. The computer-readable media of claim 11, wherein the executable instructions further cause the log file to be transferred from the memory to physical storage in response to the memory allocated to the log file being utilized to a threshold capacity.

15. A computer-implemented method for facilitating replication of virtual machines, comprising:
    receiving a log file of changes duplicating changes made to primary virtual storage of a primary virtual machine, the log file including a log file header, blocks of data that changed in the primary virtual storage, and metadata blocks to specify locations of the data in the log file;
    locating a first metadata block in the log file using information from the log file header, and storing the address of the first metadata block;
    locating one or more additional metadata blocks in the log file, each metadata block being located using information from its respectively preceding one of the metadata blocks in the log file;
    storing the addresses of each of the one or more additional metadata blocks that are located in the log file;
    locating the data identified by each of the stored metadata blocks; and
    storing the located data in replicated virtual storage operable by a recovery virtual machine to replicate the primary virtual machine.

16. The computer-implemented method of claim 15, wherein:
    the information from each of the metadata blocks includes an address offset relative to a base address of the replicated virtual storage, and a data length of the data identified by the respective metadata block; and
    storing the located data in the replicated virtual storage comprises storing blocks of the data having the data length at their respective address offset locations in the replicated virtual storage.

17. The computer-implemented method of claim 15, wherein storing the address of the first metadata block and storing the addresses of each of the one or more additional metadata blocks comprises pushing the first and additional metadata blocks onto a stack in an order in which they will be removed to locate the data in the log file.

18. The computer-implemented method of claim 15, further comprising:
    creating the log file at the primary virtual machine by duplicating write requests from the primary virtual machine into the log file in parallel with the writing of the write requests to the primary virtual storage; and
    transmitting the log file to a recovery server hosting the recovery virtual machine.

19. The computer-implemented method of claim 15, further comprising:
    creating one or more undo log entries in an undo log file in connection with the storing of the located data in the replicated virtual storage; and
    reverting the recovery virtual machine to a point in time by applying to the virtual storage one or more of the undo log entries back to the point in time.

20. The computer-implemented method of claim 19, wherein reverting the recovery virtual machine to a point in time comprises applying the one or more of the undo log entries in reverse chronological order to the virtual storage based at least on timestamp values for each of the one or more of the undo log entries.

\* \* \* \* \*